US012712825B2

(12) United States Patent
Kolan

(10) Patent No.: US 12,712,825 B2
(45) Date of Patent: Aug. 18, 2026

(54) METHODS AND APPARATUS FOR POLICY MANAGEMENT IN MEDIA APPLICATIONS USING NETWORK SLICING

(71) Applicant: Samsung Electronics Co., Ltd., Suwon-si (KR)

(72) Inventor: Prakash Kolan, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 18/161,805

(22) Filed: Jan. 30, 2023

(65) Prior Publication Data

US 2023/0254267 A1 Aug. 10, 2023

Related U.S. Application Data

(60) Provisional application No. 63/307,887, filed on Feb. 8, 2022, provisional application No. 63/417,583, filed on Oct. 19, 2022.

(51) Int. Cl.
*H04L 47/80* (2022.01)
*H04L 47/78* (2022.01)
(Continued)

(52) U.S. Cl.
CPC ............ *H04L 47/805* (2013.01); *H04L 47/78* (2013.01); *H04W 28/0268* (2013.01); *H04W 48/18* (2013.01)

(58) Field of Classification Search
CPC ....... H04L 47/78; H04L 47/805; H04L 47/80; H04W 28/0268; H04W 48/18; H04W 28/02
See application file for complete search history.

(56) References Cited

U.S. PATENT DOCUMENTS

2018/0097722 A1* 4/2018 Callard ............... H04L 12/4641
2019/0373510 A1* 12/2019 Muta ..................... H04W 72/52
(Continued)

FOREIGN PATENT DOCUMENTS

WO 2018083664 A1 5/2018
WO WO-2021212515 A1 * 10/2021 ........ H04W 36/0011

OTHER PUBLICATIONS

"3rd Generation Partnership Project; Technical Specification Group Services and System Aspects; 5G Media Streaming (5GMS); General description and architecture (Release 18)", 3GPP TS 26.501 V18.0.0, Dec. 2022, 143 pages.
(Continued)

*Primary Examiner* — Tonia L Dollinger
*Assistant Examiner* — Mehulkumar J Shah

(57) ABSTRACT

An apparatus includes a communication interface and a processor operably coupled to the communication interface. The processor is configured to provide a plurality of application flows over a plurality of network slices, wherein a first application flow is provided over a first network slice. the processor is also configured to identify that the first network slice is not providing required QoS for the first application flow. The processor is further configured to in response to identifying that the first network slice is not providing required QoS for the first application flow, select an alternate network slice based on a capability of the alternate network slice to provide (i) the required QoS for the first application flow and (ii) application service instance of the first application flow. In addition, the processor is configured to migrate the first application flow to the alternate network slice.

20 Claims, 17 Drawing Sheets

(51) Int. Cl.
*H04W 28/02* (2009.01)
*H04W 48/18* (2009.01)

(56) References Cited

U.S. PATENT DOCUMENTS

| | | | | |
|---|---|---|---|---|
| 2020/0137621 | A1* | 4/2020 | Yang | H04W 28/0289 |
| 2020/0169921 | A1* | 5/2020 | Zhu | H04W 8/02 |
| 2020/0169951 | A1 | 5/2020 | Cai et al. | |
| 2021/0037426 | A1 | 2/2021 | Zhu et al. | |
| 2021/0243641 | A1* | 8/2021 | Gangakhedkar | H04L 12/1407 |
| 2021/0266780 | A1 | 8/2021 | Huang et al. | |
| 2021/0352534 | A1* | 11/2021 | Tiwari | H04L 41/5009 |
| 2022/0264540 | A1* | 8/2022 | Panchal | H04W 72/04 |
| 2023/0189050 | A1* | 6/2023 | Rao | H04L 47/283 370/231 |
| 2023/0232229 | A1* | 7/2023 | Raghavachari | H04W 12/37 726/1 |

OTHER PUBLICATIONS

"3rd Generation Partnership Project; Technical Specification Group Services and System Aspects; Study on 5G media streaming extensions (Release 17)", 3GPP TR 26.804 V17.1.0, Sep. 2022, 130 pages.

"3rd Generation Partnership Project; Technical Specification Group Services and System Aspects; Network Slicing Extensions for 5G media services (Release 18)", 3GPP TR 26.941 V0.2.0, Aug. 2022, 16 pages.

International Search Report and Written Opinion issued May 1, 2023 regarding International Application No. PCT/KR2023/001796, 7 pages.

* cited by examiner 305
310
RF TRANSCEIVER
325
RX PROCESSING CIRCUITRY
330
SPEAKER(S)
320
MICROPHONE
315
TX PROCESSING CIRCUITRY
340
PROCESSOR(S)
350
INPUT
I/O IF
345
SENSOR(S)
365
DISPLAY
355
360
MEMORY
OPERATING SYSTEM (OS)
361
APPLICATIONS
362

METHODS AND APPARATUS FOR POLICY MANAGEMENT IN MEDIA APPLICATIONS USING NETWORK SLICING

CROSS-REFERENCE TO RELATED APPLICATION AND PRIORITY CLAIM

This application claims priority under 35 U.S.C. § 119(e) to U.S. Provisional Patent Application No. 63/307,887 filed on Feb. 8, 2022 and U.S. Provisional Patent Application No. 63/417,583 filed on Oct. 19, 2022, which are hereby incorporated by reference in their entirety.

TECHNICAL FIELD

This disclosure relates generally to multimedia devices and processes. More specifically, this disclosure relates to methods and apparatus for policy management in media applications using network slicing.

BACKGROUND

Media communication services with multiple service components are being planned for deployment with the emergence of 5G network architecture. A wide variety of service components such as audio, video, text, sensing data, haptic data, etc. could be part of such media communication services. Depending on the use cases, different service components have different quality of service (QoS), policy, and stream synchronization requirements. For providing the required end-to-end service experience, many QoS provisioning and policy management aspects have to be correctly undertaken, both at the device level and the network level. Because of changing network characteristics of underlying 5G network (e.g., latencies, packet drops, packet losses), it becomes imperative that the QoS of different media service components have to be cumulatively managed and updated in real time.

SUMMARY

This disclosure provides methods and apparatus for policy management in media applications using network slicing.

In a first embodiment, an apparatus includes a communication interface and a processor operably coupled to the communication interface. The processor is configured to provide a plurality of application flows over a plurality of network slices, wherein a first application flow is provided over a first network slice. the processor is also configured to identify that the first network slice is not providing required QoS for the first application flow. The processor is further configured to in response to identifying that the first network slice is not providing required QoS for the first application flow, select an alternate network slice based on a capability of the alternate network slice to provide (i) the required QoS for the first application flow and (ii) application service instance of the first application flow. In addition, the processor is configured to migrate the first application flow to the alternate network slice.

In a second embodiment, a method includes providing, via a communication interface, a plurality of application flows over a plurality of network slices, wherein a first application flow is provided over a first network slice. The method also includes identifying, via processor operably coupled to the communication interface, that the first network slice is not providing a required QoS for the first application flow. The method further includes in response to identifying that the first network slice is not providing the required QoS for the first application flow, selecting an alternate network slice based on a capability of the alternate network slice to provide (i) the required QoS for the first application flow and (ii) an application service instance of the first application flow. In addition, the method includes migrating the first application flow to an alternate network slice.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term “couple” and its derivatives refer to any direct or indirect communication between two or more elements, whether or not those elements are in physical contact with one another. The terms “transmit,” “receive,” and “communicate,” as well as derivatives thereof, encompass both direct and indirect communication. The terms “include” and “comprise,” as well as derivatives thereof, mean inclusion without limitation. The term “or” is inclusive, meaning and/or. The phrase “associated with,” as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term “controller” means any device, system, or part thereof that controls at least one operation. Such a controller may be implemented in hardware or a combination of hardware and software and/or firmware. The functionality associated with any particular controller may be centralized or distributed, whether locally or remotely. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
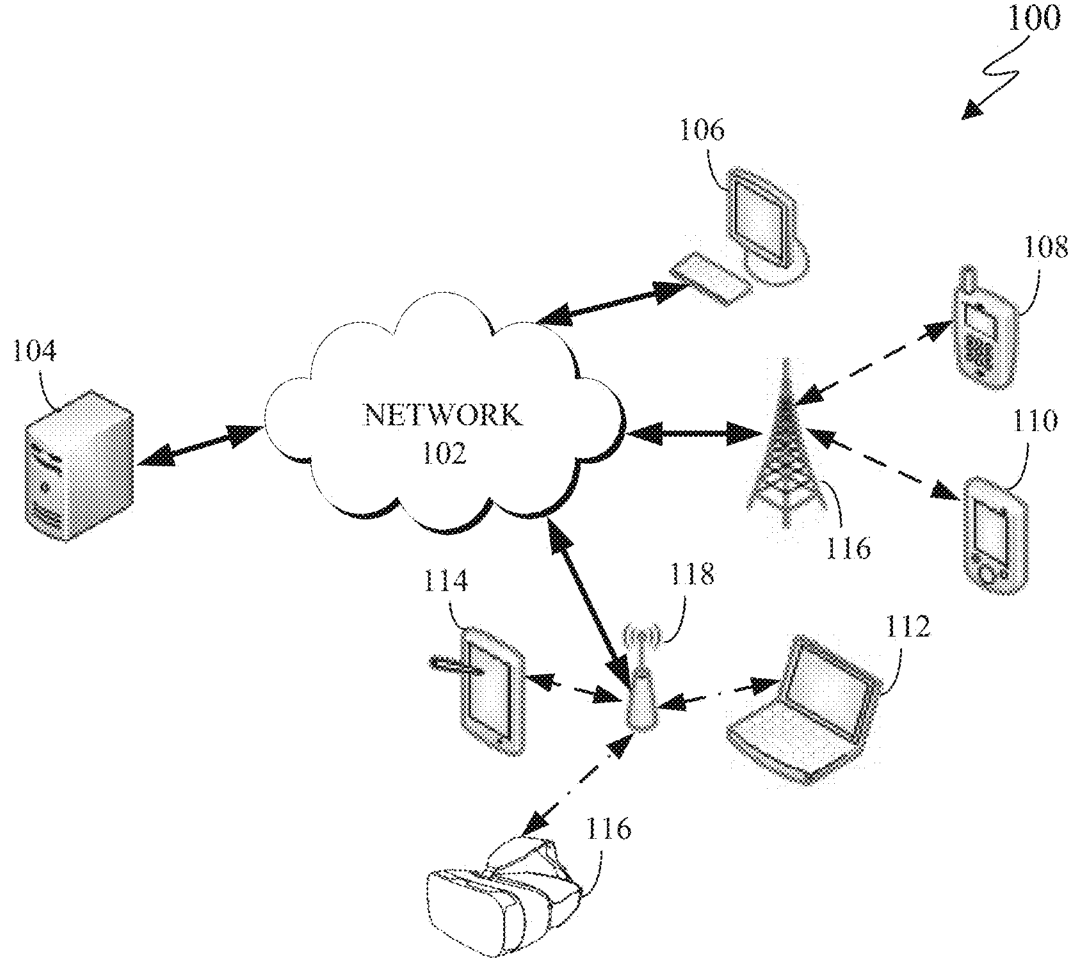
FIG. 1 illustrates an example communication system in accordance with an embodiment of this disclosure.

FIGS. 1 through 18, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz).

With the deployment of high speed 5G networks, the expectation is that 5G networks can enable complex services to end users that were not possible with older 4G networks. With new 5G network enablers like network slicing, complex media services are becoming a reality. With network slicing, media services with multiple media service components with different QoS requirements can be delivered to end users. However, as of now, the coordination between different network slices and synchronization aspects have been largely understudied. This disclosure describes methods and aspects related to provisioning and coordinating QoS and policy management, stream synchronization when such service components are deployed in different network slices. Coordination of QoS and policy can enable end-to-end service experience of the media service.

This disclosure provide aspects related to slice management aspects when the QoS policy of network slices and corresponding protocol data unit (PDU) sessions need to be updated to main the overall media service level QoS. The disclosure also provides methods for coordinating QoS and stream synchronization for different network slices. The disclosure further provides for application function (AF) to AF interface configuration and specification to enable policy management for QoS differentiated network slices.

In addition, this disclosure provides QoS coordination for optimizing QoS of different network slices, thus optimizing service performance. The disclosure also provides for Stream synchronization when multiple streams with different QoS requirements are provided in different network slices. The disclosure further provides for dynamic slice management in lieu of policy changes because of QoS change requirements.

Methods are being devised for dynamically optimizing the QoS of these component streams while they are delivered to the end user. QoS management is an important problem to solve for successful delivery of the service, and because of the virtualization technologies being undertaken at different levels (e.g., compute, network, disk space etc.), upkeep of those virtual components is not guaranteed all the time. As a result, the QoS of the services delivered using those virtual components suffer resulting in end-to-end quality degradation.

Network slicing is an emerging technology that was barely possible with the older 4G networks. But with the newer 5G networks and the technologies behind the realization of 5G networks allow for enhanced implementation of network slicing enabler. With network slicing, services can be provided using different network slices, and each network slice can be configured or managed with a different level of quality. This allows for building use cases that require different QoS for different service component streams through the network to the end user. However, the technologies that helped realize network slicing are also vulnerable to quality and reliability issues so guaranteeing QoS with those technologies becomes a problem, especially for QoS essential media services. Methods are being devised to manage and adapt to changing network conditions so end-to-end QoS can be preserved. One of such methods is the method of dynamic policy where UE can request application of dynamic policy to certain media component streams. Some aspects of QoS management for dynamic policy are required, especially when the media component streams are delivered with network slicing, so media flows in different slices can be independently managed. This disclosure describes methods for slice selection, moving media flows to different network slices for QoS based dynamic policy procedures, and resolution of slice-specific application service instances.

Figure 2:
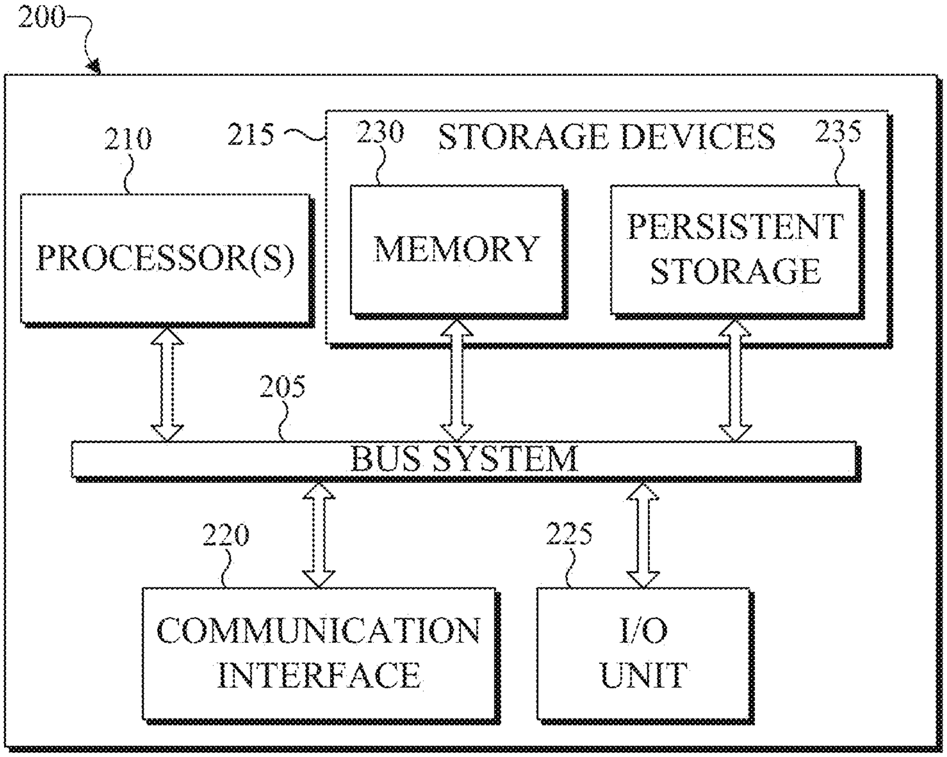
FIGS. 2 and 3 illustrate example electronic devices in accordance with an embodiment of this disclosure.
Figure 3:
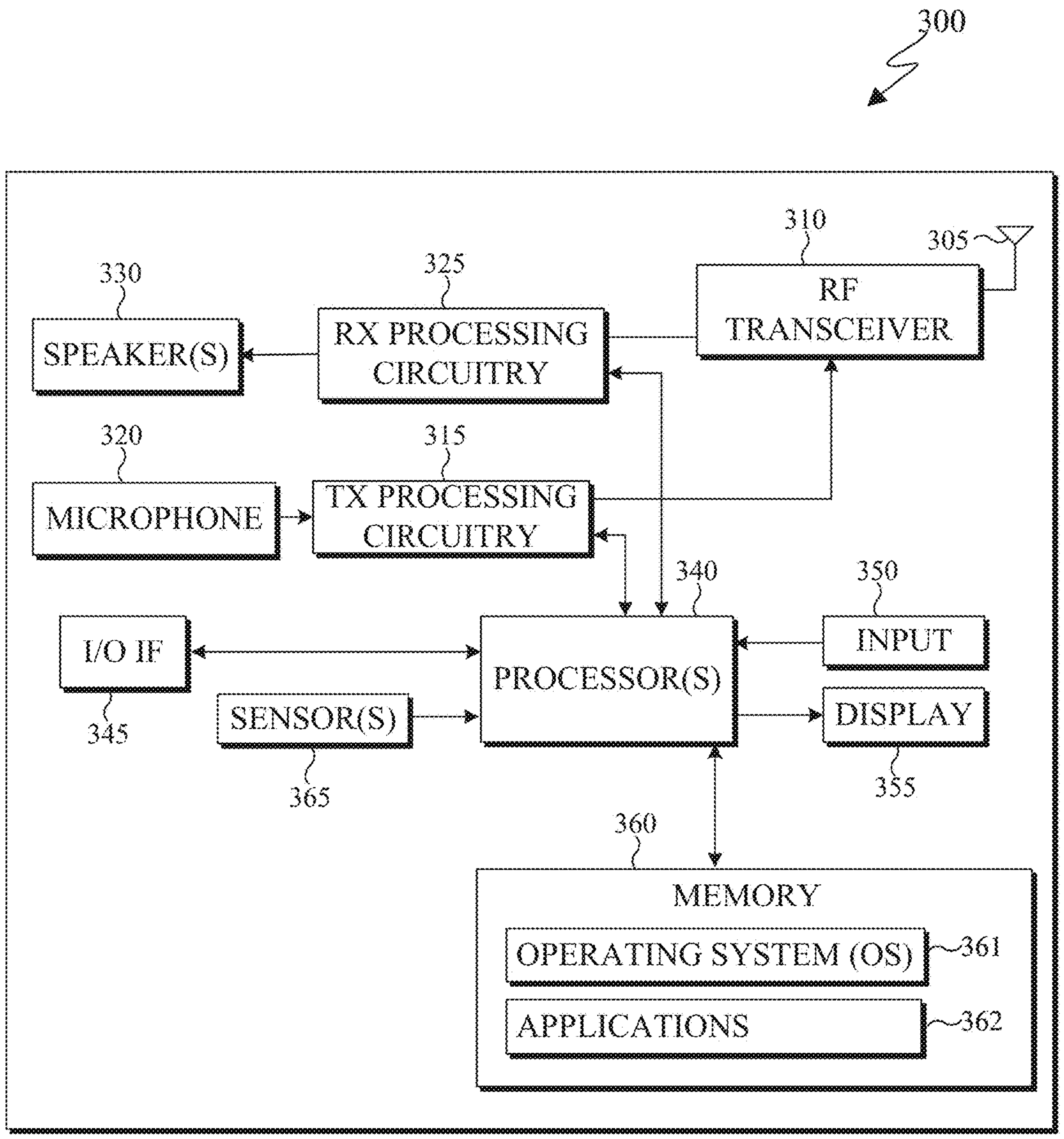

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
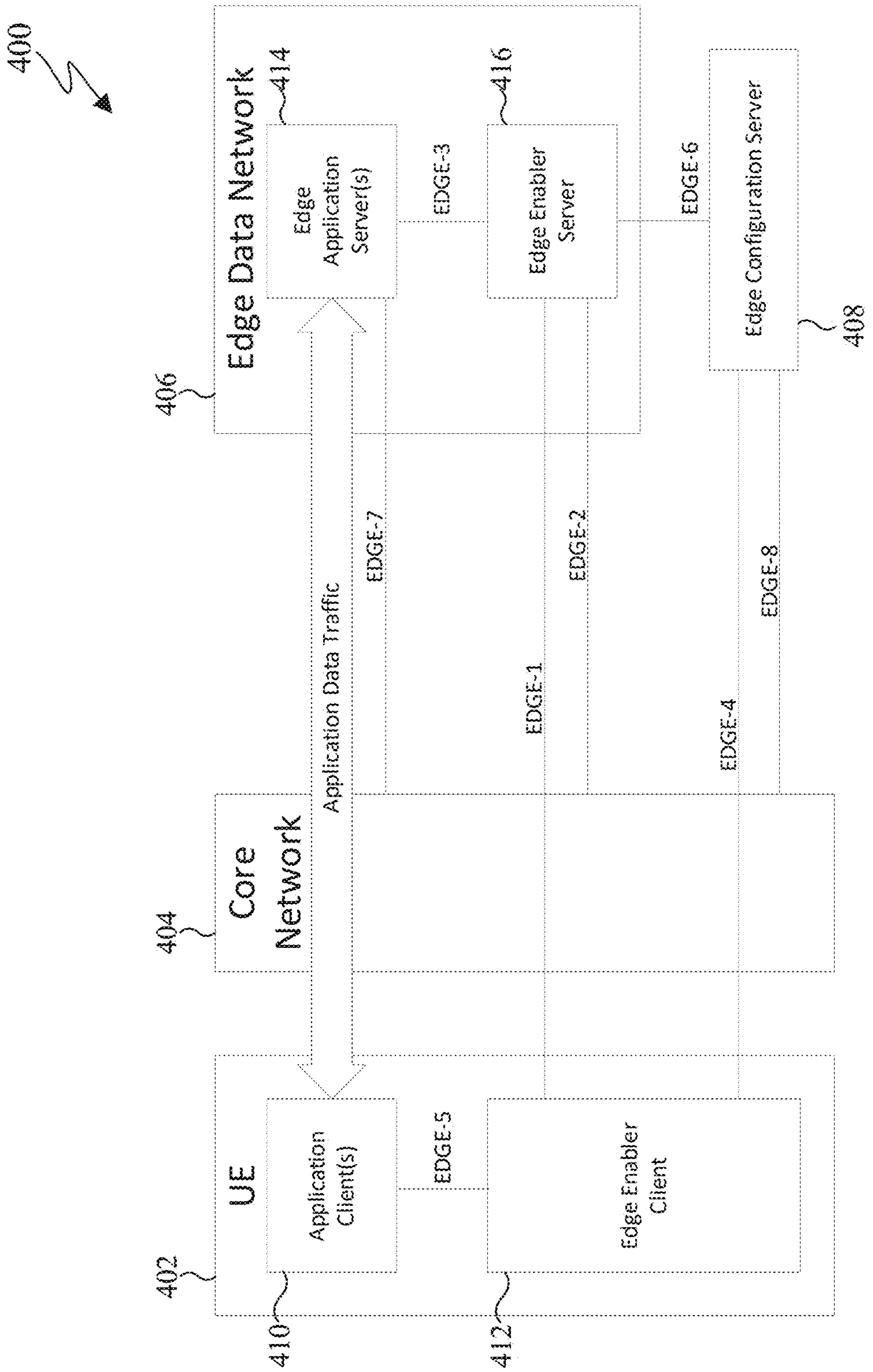
FIG. 4 illustrates an example architecture for enabling edge application in accordance with this disclosure.

FIG. 4 illustrates an example architecture 400 for enabling edge application in accordance with this disclosure. The embodiment of the edge application architecture 400 illustrated in FIG. 4 is for illustration only. FIG. 4 does not limit the scope of this disclosure to any particular implementation of an electronic device.

As shown in FIG. 4, the edge application architecture 400 includes network components 402-408 and interfaces 410-416 between those network components that can offer edge-based applications. The network components 402-408 can include a user equipment (UE) 402, a core network 404, an edge network 406, and an edge configuration server (ECS) 408. The interfaces 410-416 can include an application client 410, an edge enabler client 412, an edge application server 414, and an edge enabler server (EES) 416.

The UE 402 is a device that generates volumetric content related to a user and transmits the volumetric content to the edge network. The UE 402 receives mixed volumetric content of other users in a conference setting and renders the volumetric content in the conference setting. The UE 402 can include the application client 410 and the edge enabler client 412.

The core network 404 can assign the UE 402 to a specific node in the edge network 406. The core network 404 can direct volumetric content from the UE 402 and other UE to an edge network 406.

The edge network 406 can include media resource functions that operate to process and mix the volumetric content from the UE 402 and mix the content of other UE into a conference scene that is provided back to the UE 402. The edge network 406 can include the edge application server 414 and the EES 416. A third-generation partnership project (3GPP) system architecture and services (SA2) sub working group (SWG) defines that an edge network can be implemented as a Local Area Data Network (LADN). The premise of the edge network is that it is closer to the UE, so therefore can provide services with better latency. Application services deployed within the edge network process media destined to/originating from the UE for faster application performance.

The ECS 408 is a configuration server deployed in the edge network 406 to offer services to edge enabler client 412 to discover the appropriate EES 416 and edge application servers 414. The ECS 408 provides supporting functions needed for the edge enabler client 412 to connect with an EES 416. The ECS 408 can provision of Edge configuration information to the edge enabler client 412. The configuration information can include information for the edge enabler client 412 to connect to the EES 416 and information for establishing a connection with EESs 416. The ECS 408 can support the functionalities of registration (i.e., registration, update, and de-registration) for the EES(s) 416.

The application client 410 is a client at the UE 402 (e.g., an app) that the service provider requires the users to have to use the service. The application client 410 is the application resident in the UE 402 performing client function(s).

The edge enabler client 412 is a client at the UE 402 that interfaces with services deployed at the mobile operator edge to provide required data to the application client 410. The edge enabler client 412 abstracts the delivery of data to the application client 410, so the application client 410 does not know whether the data is being retrieved through edge network 406, core network 404, or service provider network. The edge enabler client 412 can retrieve and provision configuration information to enable the exchange of application data traffic with the edge application server 414.

The edge application server 414 is an application server deployed in the edge network 406 for the mobile operator. The edge application server 414 is the application service resident in the edge network 406, performing the server functions. The application client 410 of UE 402 can connect to the edge application server 414 in order to avail the services of the application with the benefits of edge computing.

The EES 416 provides supporting functions to enable exchange of traffic between edge enabler client 412 and edge application server 414. Such functions include discovery of edge application server 414, connection management between edge enabler client 412, ECS 408, and edge application servers 414.

The EES 416 can provision configuration information to the edge enabler client 412, enabling exchange of application data traffic with the edge application server 414. The EES 416 can interact with 3GPP core network 404 for accessing the capabilities of network functions. The EES 416 can support external exposure of 3GPP network and service capabilities to the edge application server(s) 414; support functionalities of registration (i.e., registration, update, and de-registration) for the edge enabler client(s) 412 and the edge application server(s) 414; and support the functionalities of triggering the edge application server 414 instantiation on demand.

Although FIG. 4 illustrates an edge application architecture 400 for enabling edge application, various changes may be made to FIG. 4. For example, the edge application architecture 400 and its individual components can vary as needed or desired. Also, the number and placement of various components of the edge application architecture 400 can vary as needed or desired. In addition, the edge application architecture 400 may be used in any other suitable volumetric conferencing process and is not limited to the specific processes described above.

Figure 5:
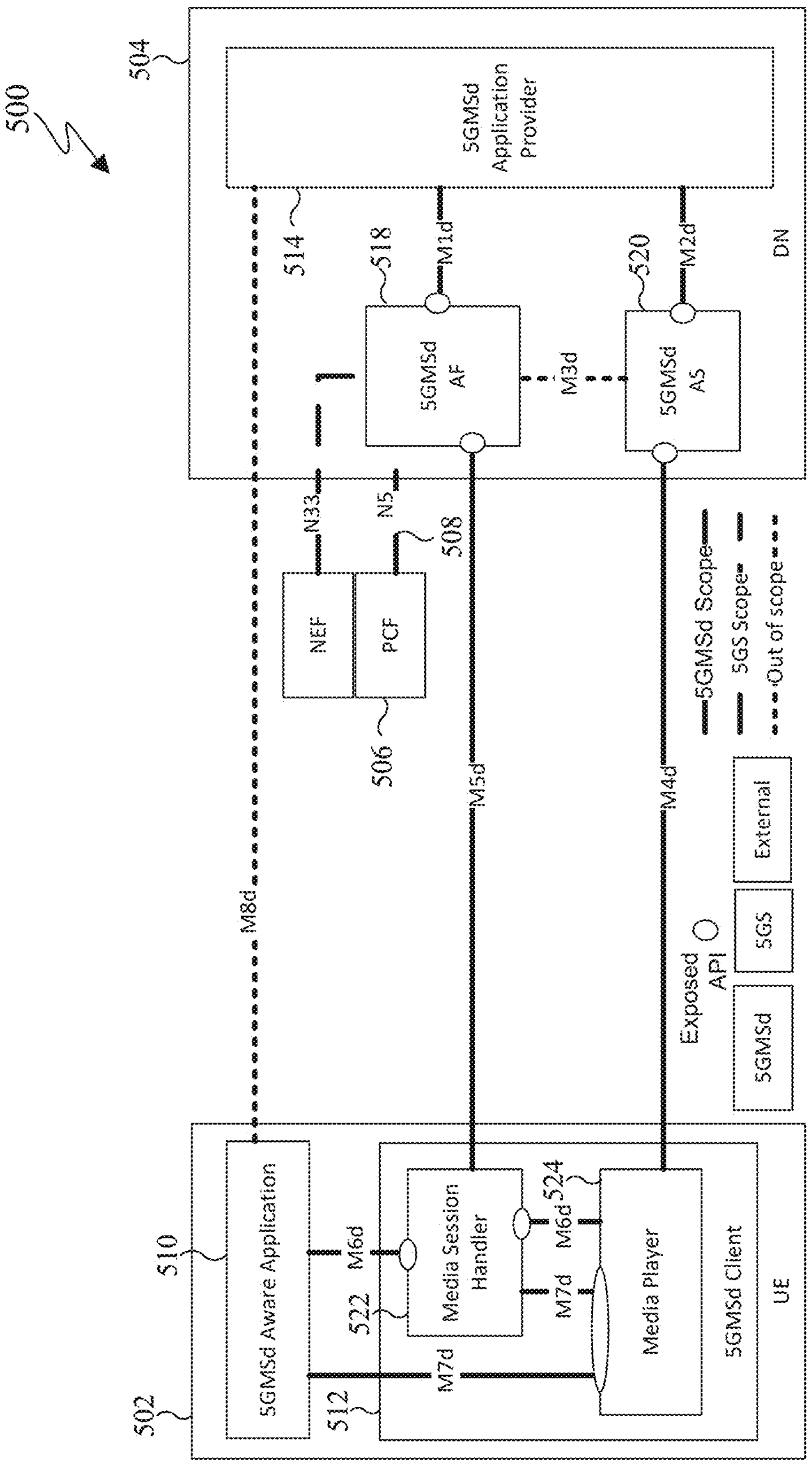
FIG. 5 illustrates an example architecture for media streaming in accordance with this disclosure.

FIG. 5 illustrates an example architecture 500 for media streaming in accordance with this disclosure. The embodiment of the media streaming architecture 500 illustrated in FIG. 5 is for illustration only. FIG. 5 does not limit the scope of this disclosure to any particular implementation of an electronic device.

5G media streaming is enabled by setting up application functions in a core network 504. A signaling application function server 518 that performs signaling function(s) and a media application function server 520 that performs media functions. There can be multiple instances of these application functions the core network 504 depending upon application requirements. Different components of UE 502 connect to these application functions to exchange signaling and media data to receive a 4G media streaming service offered by the mobile operator.

As shown in FIG. 5, 3GPP TS 26.512 specifies reference for media streaming architecture 500 for 5G media streaming (5GMS). 3GPP SA working group 4 (SA4) is standardizing media services for deployment in a 5G network. Different system components for 5G media streaming architecture 500 can include a UE 502 and a data network 504. The UE 502 can include an aware application 510, and an edge enabler client 512 (5GMSd client). The data network 504 can include an application provider 514 (5GMSd application provider), a signaling application function server 518 (5GMSd AF), and a processing media application function server (5GMSd) 520. The 5GMSd client 512 can include a media session handler 522 and a media player 524. The 5GMSd client 512 can correspond to the edge enabler client 512 shown in FIG. 5.

The aware application 510 is stored in the UE 502. The aware application 510 receives application service information from the application provider. The application service information is then used for retrieving information and data related to that application from the data network. The aware application 510 can correspond to the application client 410 shown in FIG. 4.

The signaling application function server 518 is a function in a data network 504 that performs signaling functions of the application service. The signaling application function server 518 provides various control functions to the media session handler on the UE 502 and/or the 5GMSd application provider. The signaling application function server 518 may relay or initiate a request for different policy or charging function (PCF) 506 treatment or interact with other network functions.

The media application function server 520 is an application server that hosts media functions. The media application function server 520 is dedicated to media streaming. The media application function server 520 can stream volumetric media to the UE 502.

The media session handler 522 is a component of the UE 502 that enables communication with signaling application function server 518 in the data network 504. The communications with the signaling application function server 518 are for setting up the relevant media channels between the UE 502 and the data network 504.

The media player 524 is a component of the UE 502. The media player 524 can receive media data from the media application function in the data network 504. The media player 524 can provide data to the 5GMSd aware application 510.

Although FIG. 5 illustrates a media streaming architecture 500, various changes may be made to FIG. 5. For example, the media streaming architecture 500 and its individual components can vary as needed or desired. Also, the number and placement of various components of the media streaming architecture 500 can vary as needed or desired. In addition, the media streaming architecture 500 may be used in any other suitable media streaming process and is not limited to the specific processes described above.

Figure 6:
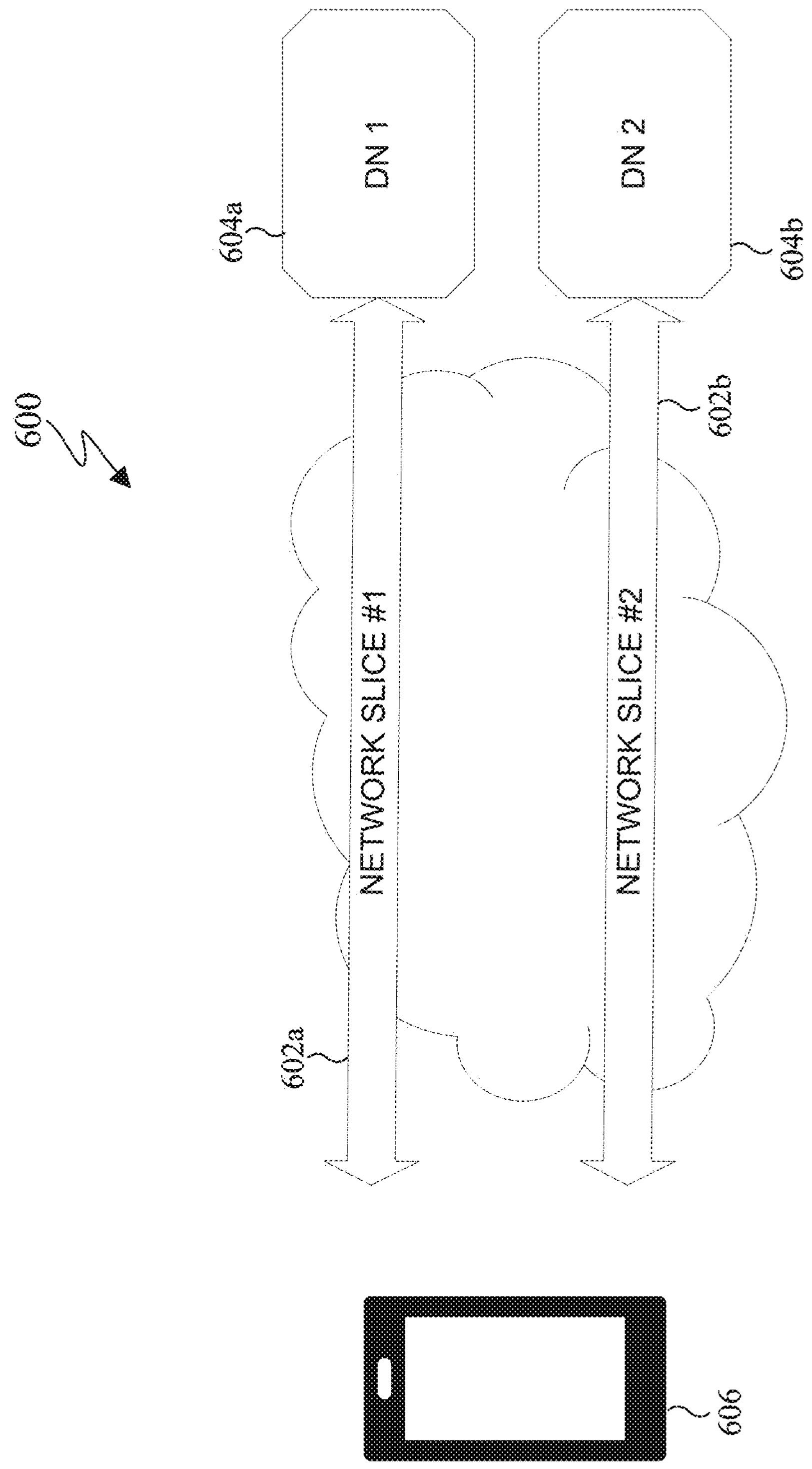
FIG. 6 illustrates an example media communication service with two network slices in accordance with this disclosure.

FIG. 6 illustrates an example media communication service 600 with two network slices 602 in accordance with this disclosure. The embodiment of the media communication service 600 illustrated in FIG. 6 is for illustration only. FIG. 6 does not limit the scope of this disclosure to any particular implementation of an electronic device.

As shown in FIG. 6, an example media communication service using two network slices 602. A first network slice **602*a* can connect to a first data network 604*a* (e.g., the 5G IMS data network) for volumetric conversational service. A second network slice 602*b* can connect to a different, second data network 604*b*, e.g., for downloading content using 5G Media Streaming as defined in 3GPP TS 26.501 and 3GPP TS 26.502. An application in the UE 606 may use these two network slices 602 based on implementation of the application running on the UE 606. In this case, the UE application is responsible for utilizing two separate network slice connections, and then bridge (or utilize) the content retrieved using two different network slices 602. However, since the support for network slicing is not natively available from the network to the UE 606, it is entirely possible that there is a synchronization issue with content retrieved using the two different network slices 602. For example, two UEs 606 are communicating with each other using the first network slice 602*a* (volumetric conversational service). As part of the interaction, the UEs 606 can agree on viewing some content together (e.g., some 2D/3D video content, images, shared collaboration etc.) for which they use the second network slice 602*b* to retrieve the content. It is possible that since the two services are not synchronized, the content the two users are trying to retrieve using the second network slice 602*b* are not available in time. This can happen because of a) different quality parameters attributed to the second network slice 602*b* compared to the first network slice 602*a* and the second network slice 602*b*) network issues. In certain embodiments, the UE 606 can negotiate similar QoS to both of the network slices 602** so some of the problems can be alleviated. However, it is still possible that the UE initiated method of synchronizing content does not go as expected.

In above case, there is no support of the network to help synchronization of content across both network slices 602. The following network support can be added to facilitate seamless experience of hybrid and media communication services.

Network slice identifiers can be carried in signaling messages of other network slices 602 when setting up media communication services. When the first network slice **602*a* is setup, and the UE 606 and network agree on a network slice identifier (e.g., S-NSSAI of the first network slice 602*a*), then while setting up the second network slice 602*b*, the UE 702 can include the slice identifier of the first network slice 602*a* in the signaling connection for setting up the media communication using the second network slice 602*b* (e.g., using a "component slices" field). Similarly, once the second network slice 602*b* is setup, the first network slice 602*a* is updated with the slice identifier of the second network slice 602*b* so the control plane nodes of the first network slice 602*a* are aware that a corresponding network slice 602 (with slice identifier of the second network slice 602*b***) is setup.

In addition, to have the control plane nodes of all network slices 602 aware of other network slices 602 for the media communication/hybrid service, a "Media-communication-Service-Id" field can be included in all media service connection setup requests for each of the network slices 602 utilized for that media communication service. FIG. 6 shows the above steps and different signaling message fields for setting up media communication service with two network slices 602.

FIG. 6 is an example for a media communication service with two network slices 602, which can be expanded to a media communication service with any number of network slices 602. For a media communication service with "N" network slice 602, the UE 606 can perform similar action, i.e. for each subsequent connection request for the media communication service utilizing another network slice 602, the UE 606 can include a list of slice identifiers of all network slices 602 that have already been setup for the media communication service. Additionally, for each setup request for the media communication service utilizing a new network slice, the UE 606 can update already setup network slices 602 with the slice identifier of the newly setup network slice 602. In certain embodiments, when the UE 606 decides that a network slice 602 is not needed any more for the media communication service, the UE 606 can terminate the network slice 602 that is not needed, and then updates every other network slice 602 that a network slice 602 with a given slice identifier has been terminated.

The 5G AF in each network slice 602 that is responsible for serving the UE 606 is made aware of other network slices 602 in the media communication service as defined above. Once all the AFs in all the connected network slices 602 are made aware of other network slice identifiers then a common QoS and quality of experience (QoE) framework can be implemented.

Media services can be provisioned using network slicing when then the media service is expected to have multiple media streams (e.g., audio, video, text, control etc.) that may require different QoS treatment during the service delivery stage.

Many such media services are being discussed in different 3GPP groups that may benefit with setting up those services with multiple network slices. Examples of such media services are specified in 3GPP SA WG1 TR 22.847. This disclosure provides stage 1 use cases and potential 5G requirements on supporting tactile and multi-modal communication services. Specifically, aspects such as study of new scenarios, use cases and potential requirements for immersive real time experience involving tactile and multi-modal interactions (including network assistance for coordination, charging and security aspects, key performance indicators (KPIs)), and gap analysis is included in the scope of this technical specification. As part of this disclosure, multiple use cases for tactile and multi-modal communication are included. Among these use cases are couple of use cases related to media that are a strong candidate for realization using network slicing.

Examples of use cases include immersive multi-modal virtual reality applications and immersive virtual reality games. Both of the use cases can require multiple multi-modal media streams between the user and the 5G network. For example, the use cases can be realized by running the audio and video streams for HMD devices in a first network slice 602*a* and the haptic content from sensing devices such as gloves in a second network slice 602*b*. Since the use case description mentions differential QoS treatment for above media streams, QoS can be provisioned differently for those two network slices carrying content of different modality.

The application provider provisions a list of policy templates at the AF which the media session handler (MSH), a UE component of UE, fetches from the AF, picks one policy among the available policy templates, and requests application of that policy using an M5 interaction. As part of the policy information, the MSH requests certain QoS to the PDU session for which the policy application is sought. The QoS information includes the fields in the following TABLE 1.

TABLE 1

| | |
|---|---|
| qosReference | As defined in clause 5.6.2.7 of TS 29.514 [34]. |
| maxBtrUl | Maximum Bitrate Uplink. |
| maxBtrDl | Maximum Bitrate Downlink. |
| maxAuthBtrUl | Maximum Authorized Bitrate Uplink by 5GMS Application Provider. |
| maxAuthBtrDl | Maximum Authorized Bitrate Downlink by 5GMS Application Provider. |
| defPacketLossRateDl | Default packet loss rate for Downlink. |
| defPacketLossRateUl | Default packet loss rate for Uplink. |

When network slicing is used to provision the service, the PDU session associated with the network slice has certain QoS specification information that could have different values than the requested QoS values using the policy update procedure. As a result, the UE 606 can be moved out of the PDU session or the network slice to achieve the requested QoS. To facilitate this, a network slice policy (NSP) is to be made available to the MSH/UE.

The NSP can have multiple options from which can be selected by the MSH, including request creation of a new network slice, requested creation of a network slice with parameter offsets, and move to a slice with a closest QOS. The request creation of a new network slice option has the AF responsible for the media service can request creation of a network slice to the SMO layer. The QoS parameters for the PDU session associated with the new network slice can be similar to the QoS sought by the MSH/UE. The request creation of a network slice with parameter offsets option is similar to the request creation of a new network slice option with an addition that each of the QoS parameters. A parameter offset table is constructed to indicate an offset for each parameter in the QoS specification table. The move to a slice with a closest QoS option, the UE 606 can indicate a preference for the network to choose a PDU session or network slice that is closest in terms of QoS specification as indicated by the MSH or UE 606. Alternatively, the MSH or UE 606 can select the PDU session that is closest in QoS values by checking all existing PDU sessions and use that PDU session for future use. The above NSP can also be part of the network slice selection policy (NSSP) that is sent from the network to the UE 606, which the UE 606 can use for slice policy management.

Which slice the UE 606 or MSH can use to communicate to the AF when the media service is provisioned with multiple network slices has not previously been adequately specified. The following options are available to the UE 606 or MSH to determine which network slice to use for dynamic policy requests i.e., M5 interactions. A first option is that a unique network slice 602 is configured by the application service provider, which the UE 606 or MSH can use to send dynamic policy requests. When the application provider communicates this option to the AF, the AF can ensure network endpoints on all network subnets of all network slices to be reachable by any PDU session in the UE 606. In this case, the UE 606 can use the configured PDU session or network slice for dynamic policy requests.

A second option is that one network slice 602 among the multiple network slices 602 can be configured as a "default slice" for the media service. When the application provider communicates this option to the AF, the AF can ensure that network endpoints on the configured default slice can be reachable by the UE 606 in the respective PDU session or network slice. In this case, the UE 606 can use the configured default PDU session or network slice for dynamic policy requests.

A third option is for an AF-AF communication interface can forward M5 dynamic policy requests from any PDUSession or network slice 602 so it doesn't really matter which PDUSession/network slice is used for dynamic policy requests.

A fourth option is that an application service provider can configure a M5 slice selection policy at the AF, which can have the following sub-options. A first sub-option can be that an application service provide configures a round robin, where the UE/606 or MES can use a round robin method on all PDU sessions or network slices for dynamic policy requests. A second sub-option is random slice selection for M5 requests. A third sub-option is for the application service provider to configure a lice with minimum bandwidth, where the UE 606 or MSH can use a PDU session or network slice 602 that currently carries a minimal traffic bandwidth i.e., uses the PDU session or network slice 602 with minimal impact to underlying service traffic. A fourth sub-option is for the application service provider to configure a slice used to reach an AF last, where the UE 606 or MSH uses a PDU session or network slice 602 that was successfully used to reach the AF managing the network slices 602. If such a sub-option is used, there is a good probability that the UE 606 or MSH is able to reach the AF for dynamic policy requests.

A fifth option is that multiple options for M5 slice selection policy can be configured by the application service provider at the AF, then a preference order for those options can be provided or predetermined.

Although FIG. 6 illustrates a media communication service 600, various changes may be made to FIG. 6. For example, the sizes, shapes, and dimensions of the media communication service 600 and its individual components can vary as needed or desired. Also, the number and placement of various components of the media communication service 600 can vary as needed or desired. In addition, the media communication service 600 may be used in any other suitable network slicing process and is not limited to the specific processes described above.

Figure 7:
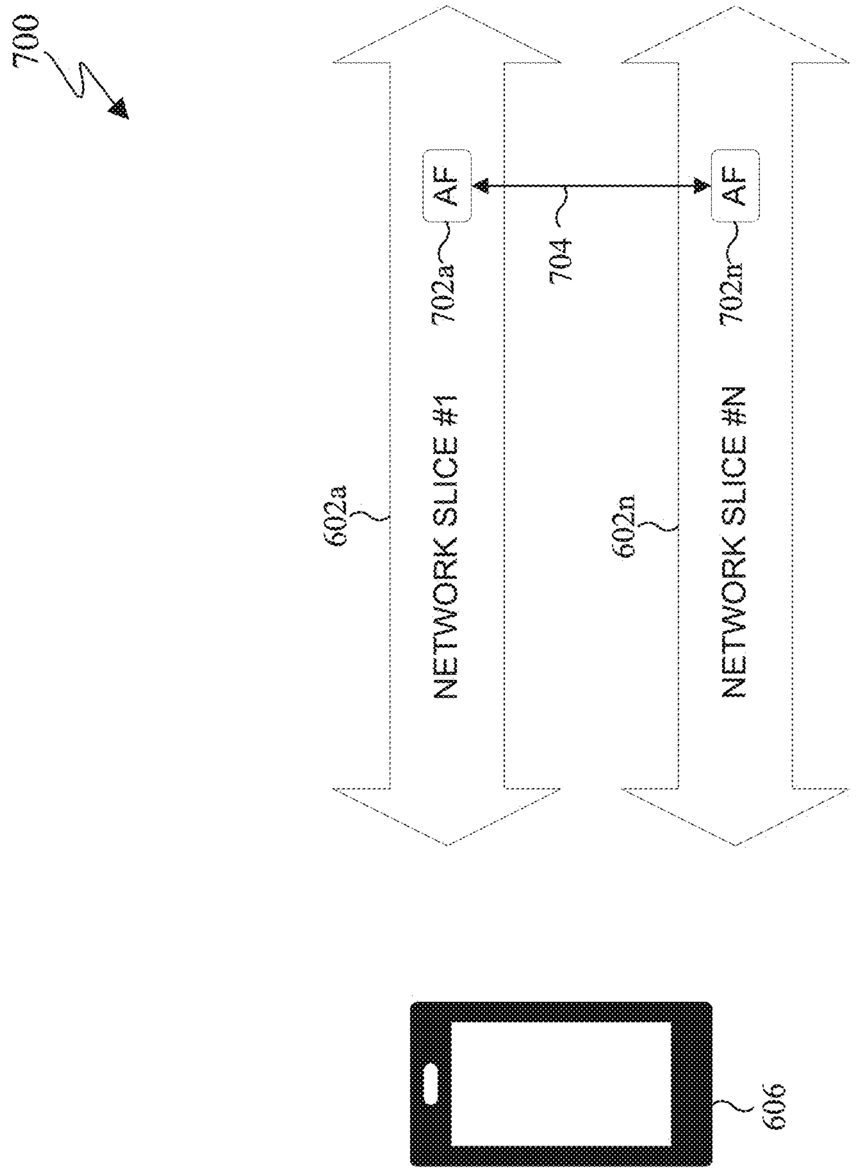
FIG. 7 illustrates an example AF-AF communication between an AF of a first network slice and an AF of a nth network slice in accordance with this disclosure.

FIG. 7 illustrates an example AF-AF communication 700 between a first AF 702*a* of a first network slice 602 and another AF 702*n* of another network slice 602*n* in accordance with this disclosure. The embodiment of the AF-AF communication 700 illustrated in FIG. 7 is for illustration only. FIG. 7 does not limit the scope of this disclosure to any particular implementation of an electronic device.

As shown in FIG. 7, the communication interface 704 between two AFs 702 for media applications has been largely unspecified. The following interface capabilities can be included as part of AF-AF communication 700 to enhance the media application service experience.

A first interface capability can include provisioning of another AF 702. An application service provider can provision a service at an AF 702 for a media service with multiple network slices 602. Provisioning is done with one M1 interaction between application service provider and an AF 702. However, multiple AFs 702 can manage multiple network slices 602 of the media service. To facilitate provisioning using one M1 interaction, a first AF 702*a* that is initially provisioned with service information can communicate with all other Afs 702 to complete the provisioning of all network slices 602 of the media service. To allow this feature, information can be shared by the first AF 702*a* to each other AF 702*n* of each network slice 602. The information can include per slice QoS information, network assistance-end point information, metrics configuration information, dynamic policy information, etc.

The per slice QoS information can be the same as the QoS specification specified in 3GPP TS 26.512. The first AF 702*a* can generate per slice QoS information based on information received from the application service provider. The first AF 702*a* can also include parameter thresholds for each QoS parameter in the above QoS specification and offsets for each QoS parameter, which essentially provides a range for each QoS parameter in the QoS specification.

The network assistance end point information can include endpoint information about where to forward network assistance information. Endpoint information can include the first AF 702*a* itself thereby allowing for the first AF 702*a* to be a master AF. Endpoint information can also indicate that the endpoint information can be of a different network assistance service that can be a collector of network assistance information of all network slices 602. The endpoint information could also be the 3GPP defined network data analytics function (NWDAF) that can collect network assistance information along with other network related statistics information.

The metrics configuration information can include types of metrics information to collect regarding the PDU session or network slice 602. The metrics configuration information can be provided along with endpoint information where to send the metrics information, start and end times when to start and stop collecting the metrics, a list of metrics to collect, and a list of user or percentage of population to collect the metrics information from.

The first AF 702*a*, acting as a master AF, can receive dynamic policy information from a MSH or UE 606. The first AF 702*a* can forward this dynamic policy information to any AF 702 in respective network slice 602 so the AF 702 in each network slice 602 can apply the policy for the PDU session corresponding to that network slice 602.

For dynamic policy and network assistance, an AF 702, when it receives dynamic policy or network assistance information about a PDU session that is under the control of another AF 702, can forward that information to the other AF 702. UEs 606 can forward dynamic policy or network assistance information to a different AF 702 because the actual AF 702 that is managing the PDU session could be unreachable using that PDU session by the UE 606. When the AF 702 forwards this information to the other AF 702, the information can include a capability to act as an AF relay information, setup endpoint on subnet information, URL to a document information, etc.

The capability to act as an AF relay information can indicate the receiving AF 702 can act as a relay between the UE 606 and the controlling AF 702. When the controlling AF 702 receives the dynamic policy or network assistance information forwarded by the receiving AF 702, the controlling AF 702 can choose to use the receiving AF 702 as the relay endpoint. Thus, all requests and responses can be relayed by the receiving AF 702.

The setup endpoint on subnet information can indicate that the AF 702 can request the controlling AF 702 to setup a network endpoint on a subnet so the UE 606 can directly reach the controlling AF 702. To facilitate this setup, the AF 702 can include information about network subnet information.

The URL to a document information can indicate that the AF 702 can persist that information in a database document, and send the URL to that database document to the controlling AF 702. The controlling AF 702 can retrieve and follow the dynamic policy or network assistance information.

When different network slices 602 deliver streams to the UE 606 that requires different QoS treatment, QoS policies of the different network slices 602 have to be coordinated and streams of the different network slices 602 can be synchronized for proper re-accumulation of content at the video player in UE 606 before the combined streams are played to a user at the UE 606. To facilitate QoS policy coordination, information could be conveyed from an AF 702*a* in a first network slice 602*a* to another AF 702*n* in another network slice 602*n*.

For service configuration, the network slice policy can be initially provisioned by the application service provider at the 5G AF 702 managing the service. Such information is provisioned at the 5G AF 702 by the application provider using the M1 interface specified in TS 26501 and TS 26512. Service configuration information can be included in the M1 provisioning information from the application provider to the 5G AF 702 for the media service. Examples of service configuration information can be found in TABLE 2.

TABLE 2

| Field | Description |
|---|---|
| Allow-UE-slice-relocation-during-dynamic-policy | Boolean variable indicating that the UE/MSH can relocate from one network slice to another network slice, or from one PDU session to another PDU session during dynamic policy procedures. The variable can take the following values:<br>True: AF can allow relocation of UE/MSH to another network slice or PDU session<br>False: AF cannot allow relocation of UE/MSH to another network slice or PDU session |
| Allow-network-slice-creation-during-dynamic-policy | Boolean variable indicating that a network slice can be created during dynamic policy procedures if none of the existing network slices cannot provide requested QoS. |
| Allow-relocation-to-closest-slice | Boolean variable indicating that the UE/MSH can move to a network slice that provides closest QoS guarantees if there are no available network slices that can provide all the requested QoS guarantees |
| Relocation-offsets | Map/List of QoS parameters with their allowed offsets while allowing the UE to move to the closest slice |
| Service-QoS | Service wide QoS information. The QoS information is similar to QoS specification as specified in TS 26512.<br>When the AF receives this information, it shall break it down into individual slice level QoS specification information and send that information to each AF of different network slice |
| Slice-AF-Identifier-list | List of endpoint information of individual slice level AFs.<br>When the initial AF receives this information, it shall contact the list of AFs in this list with the parameters described earlier in the disclosure |
| Slice-QoS-threshold-map | Map of QoS thresholds for different slices. Each <kay, value> pair in the map is as follows:<br>Key: represents the slice identification such as the S-NSSAI<br>Value: Object representing a map of parameter name -> threshold mappings. Each parameter corresponds to each QoS parameter in QoS specification object of TS 26512 |
| Slice-QoS-offset-map | Map of QoS offset (allowed deviation) for different slices. Each <kay, value> pair in the map is as follows:<br>Key: represents the slice identification such as the S-NSSAI<br>Value: Object representing a map of parameter name -> offset mappings. Each parameter corresponds to each QoS parameter in QoS specification object of TS 26512 |
| Initial-AF-configure-network-assistance | Boolean variable indicating whether the initial AF should configure network assistance in all network slices. Possible value:<br>True: Indicates that the initial AF should contact AFs of all network slices to configure network assistance<br>False: Indicates that the initial AF should not configure network assistance |
| AF-network-assistance-collector | Boolean variable indicating whether the initial AF should be the collector of all network assistance information from all AFs of different network slices |
| Network-assistance-end-point | If the network assistance is to be collected by a different entity, endpoint information of that entity |
| NWDAF-network-assistance | Boolean variable to indicate if network assistance information is to be sent to NWDAF<br>If set to True, the AF can discover the endpoint information of NWDAF to forward network assistance information to the NWDAF |
| Metrics-reporting-end-point | endpoint information of the entity to collect the reports |
| Metrics-reporting-start-time | Start time to collect the reports |
| Metrics-reporting-stop-time | Stop time to collect the reports |
| AF-metrics-reports-collector | Boolean variable indicating whether the initial AF should be the collector of all metrics information from all AFs of different network slices |
| Percentage-of-users | % of users to collect the metrics reports from in each slice |
| User-list | URL to the user list from whom the metrics to be collected mandatory from |
| Unique-sliceId-M5 | Unique slice Id (S-NSSAI) for M5 dynamic policy interactions from UE/MSH to AF |

TABLE 2-continued

| Field | Description |
|---|---|
| Default-sliceId-M5 | Default slice Id (S-NSSAI) for M5 dynamic policy interactions from UE/MSH to AF |
| Use-AF-to-AF-interface-M5 | Boolean variable to indicate use of AF-> AF communication mechanism described earlier in the disclosure for determining which PDU session/network slice to use for M5 dynamic policy requests |
| M5 Slice Selection Policy | Enumeration of techniques to use for selecting slice for M5 operations. Values include:<br>Round Robin<br>Random<br>Slice with min bandwidth<br>Slice use to reach AF last<br>One or more of the values can be configured by the application service provider. |
| M5 Slice Selection Policy Preference | Preference order for different options for M5 Slice Selection Policy above |

Although FIG. 7 illustrates an example AF-AF communication 700, various changes may be made to FIG. 7. For example, the number and placement of various components of the AF-AF communication 700 can vary as needed or desired. In addition, the AF-AF communication 700 may be used in any other suitable network slicing process and is not limited to the specific processes described above.

Figure 8:
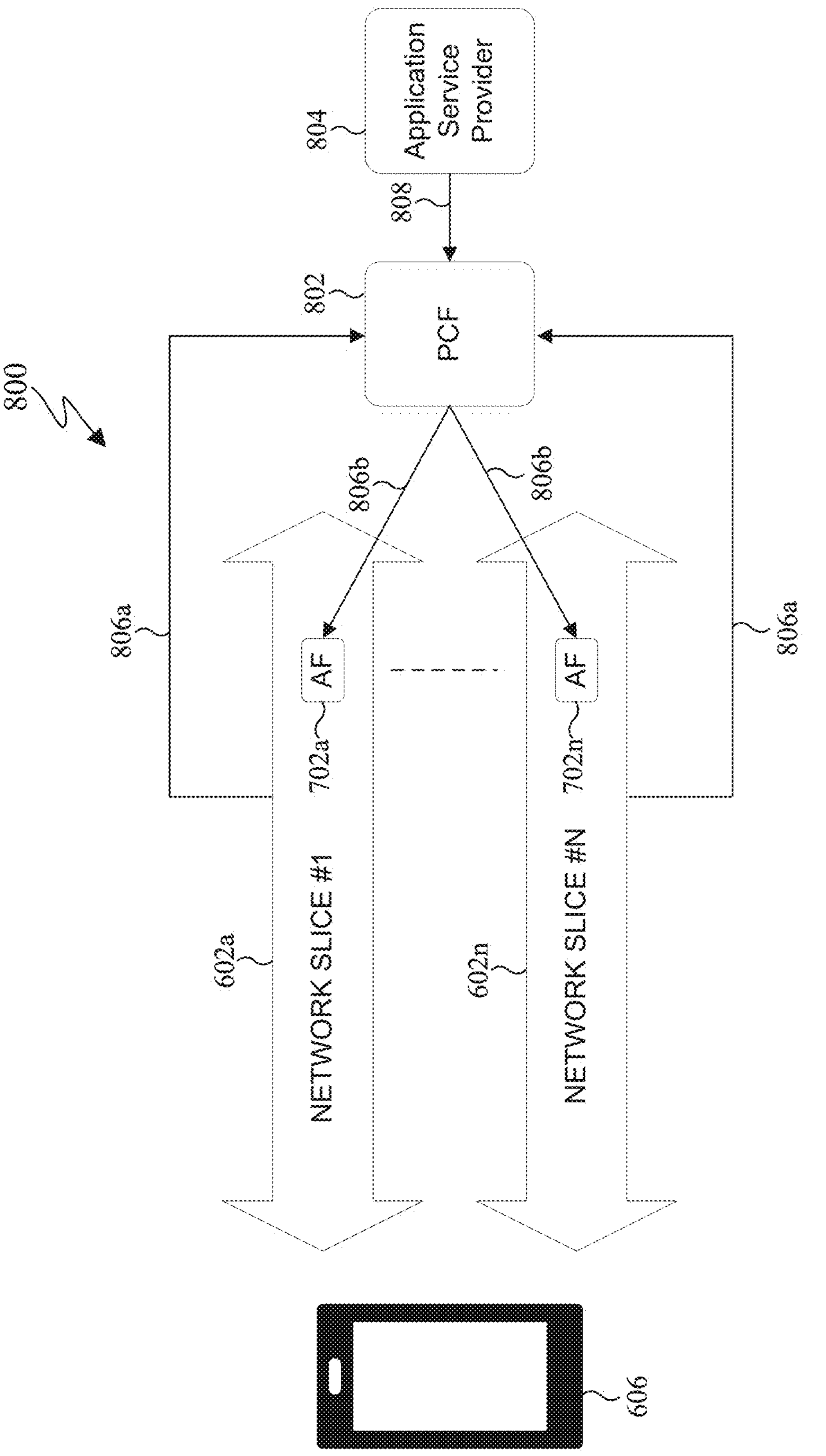
FIG. 8 illustrates an example QoS coordination using a policy control function (PCF) in accordance with this disclosure.

FIG. 8 illustrates an example QoS coordination 800 using a PCF 802 and an application service provider 804 in accordance with this disclosure. The embodiment of the QoS coordination 800 illustrated in FIG. 8 is for illustration only. FIG. 8 does not limit the scope of this disclosure to any particular implementation of an electronic device.

As shown in FIG. 8, AF-AF communication can be used for stream synchronization. AFs 702 of different slices can exchange current QoS information 806*a* and expected QoS information 806*b* with a PCF 802 for QoS coordination and stream synchronization. With this procedure, the PCF 802 can be enabled with per slice QoS information. Such information can be configured by the application service provider 804 at the PCF 802. Once the PCF 802 is configured with the QoS information 806, any requests for QoS information 806 from AFs 702 of different network slices 602 can responded to by the PCF 802 with expected values of individual QoS parameters (e.g., that of QoS specification as defined in TS 26.512). In certain embodiments, the PCF 802 can use the services of network functions for deriving per slice QoS requirements 808, where the network functions can include NWDAF, network slice admission control (NSAC), and an application service provider.

The NWDAF can receive per slice network metrics from a media service management and orchestration (SMO), AF 702, and other network control functions. Such information can be useful for the PCF 802 to estimate the expected QoS parameters for each network slice 602 of a media service. The NSAC function can be used to generate per slice QoS requirements 808 and admission control information, which can then be used to generate per slice QoS information. The application service provider 804 can be provided per slice metrics information. Since application provider has such information, the application service provider 804 can easily compute per slice QoS requirements 808 dynamically and send the per slice QoS requirements 808 back to PCF 802. Once per slice QoS requirements 808 is available at the PCF 802, any requests from AF 702 about such data can easily sent to requesting AF functions. The AF functions, once they received this data, can alter the QoS of the PDU session or network slice 602 to achieve the requested QoS.

Although FIG. 8 illustrates an example QoS coordination 800, various changes may be made to FIG. 8. For example, the number and placement of various components of the QoS coordination 800 can vary as needed or desired. In addition, the QoS coordination 800 may be used in any other suitable network slicing process and is not limited to the specific processes described above.

Figure 9:
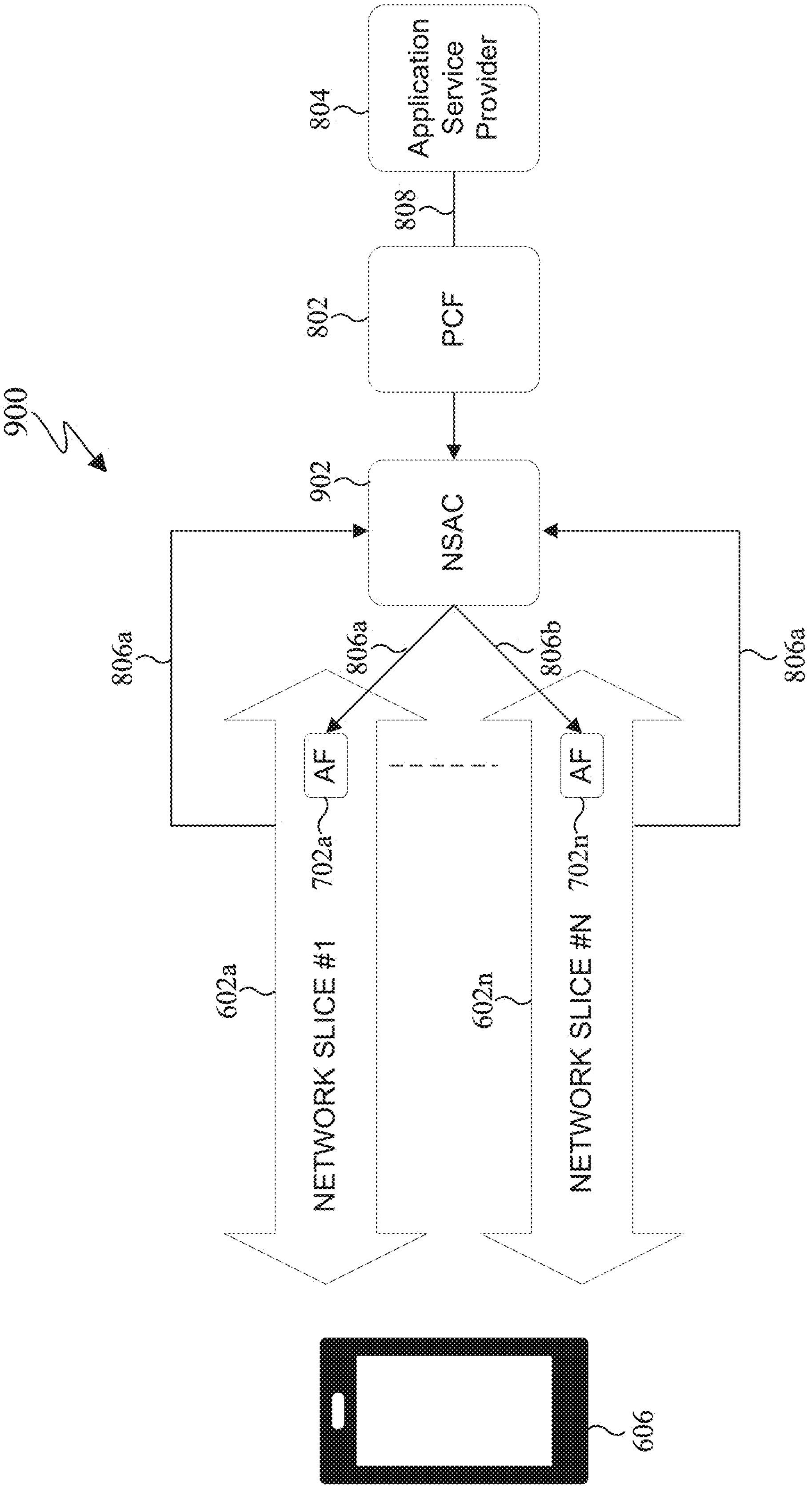
FIG. 9 illustrates an example QoS coordination using a network slice admission control (NSAC) in accordance with this disclosure.

FIG. 9 illustrates an example QoS coordination 900 using an NSAC 902 in accordance with this disclosure. The embodiment of the QoS coordination 900 illustrated in FIG. 9 is for illustration only. FIG. 9 does not limit the scope of this disclosure to any particular implementation of an electronic device.

As shown in FIG. 9, QoS Policy coordination 900 and stream synchronization can be provided using an NSAC 902. With this procedure, the NSAC 902 can be enabled with per slice QoS information. Such information can be configured by the application service provider 804 at the PCF 802 and read by the NSAC 902. Once this information is available at the NSAC 902, any requests for QoS information from AFs 702 of different network slices 602 can be responded to by the NSAC 902 with expected values of individual QoS parameters (e.g., that of QoS specification as defined in TS 26.512). Alternatively, the NSAC 902 can use the services of network functions for deriving per slice QoS requirements 808. The network functions can include NWDAF, PCF, and application service provider. The NWDAF can receive per slice network metrics from an SMO, an AF 702, and other network control functions. Such information can be useful for the NSAC 902 to estimate parameters for the expected QoS 806*b* for each network slice 602 of a media service. The PCF function can be used to generate per slice QoS requirements 808 with the help from other network functions or the application service provider 804. This information can then be shared with NSAC 902. The application service provider 804 can be provided per slice metrics information. Since application service provider 804 has such information, the application service provider 804 can dynamically compute per slice QoS requirements 808 using the information and send the per slice QoS requirements 808 back to NSAC 902 through PCF 802. Once the per slice QoS requirements 808 is available at the NSAC 902, any requests from an AF 702 about such data can easily sent to requesting AF functions. The AF functions, once they received this data, can alter the QoS of the PDU session or network slice 602 to achieve the requested QoS.

Although FIG. 9 illustrates an example QoS coordination 900, various changes may be made to FIG. 9. For example, the number and placement of various components of the QoS coordination 900 can vary as needed or desired. In addition, the QoS coordination 900 may be used in any other suitable network slicing process and is not limited to the specific processes described above.

Figure 10:
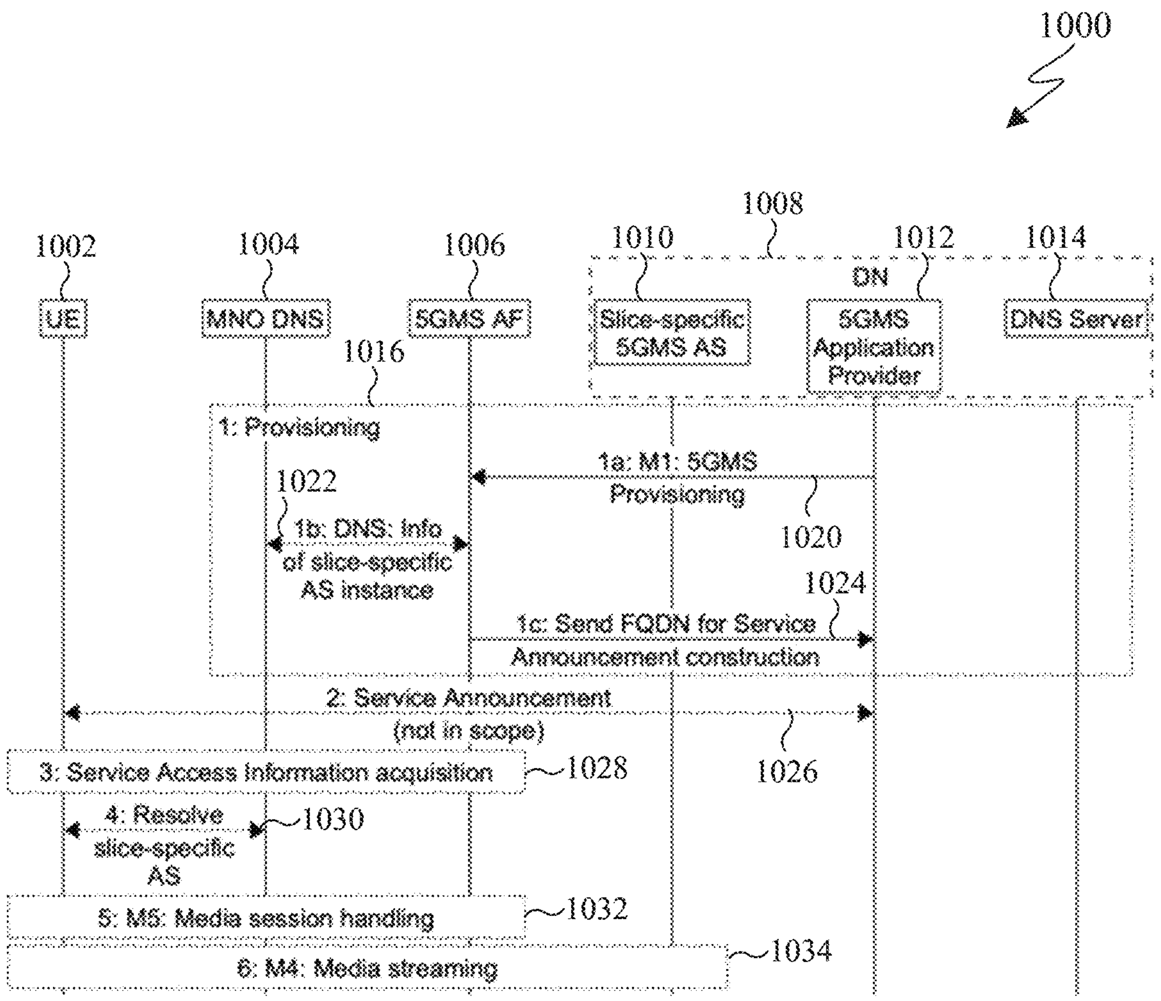
FIG. 10 illustrates an example procedure for domain name service-based resolution of slice-specific application server-instances when mobile network operator domain name service is authoritative in accordance with this disclosure.
Figure 11:
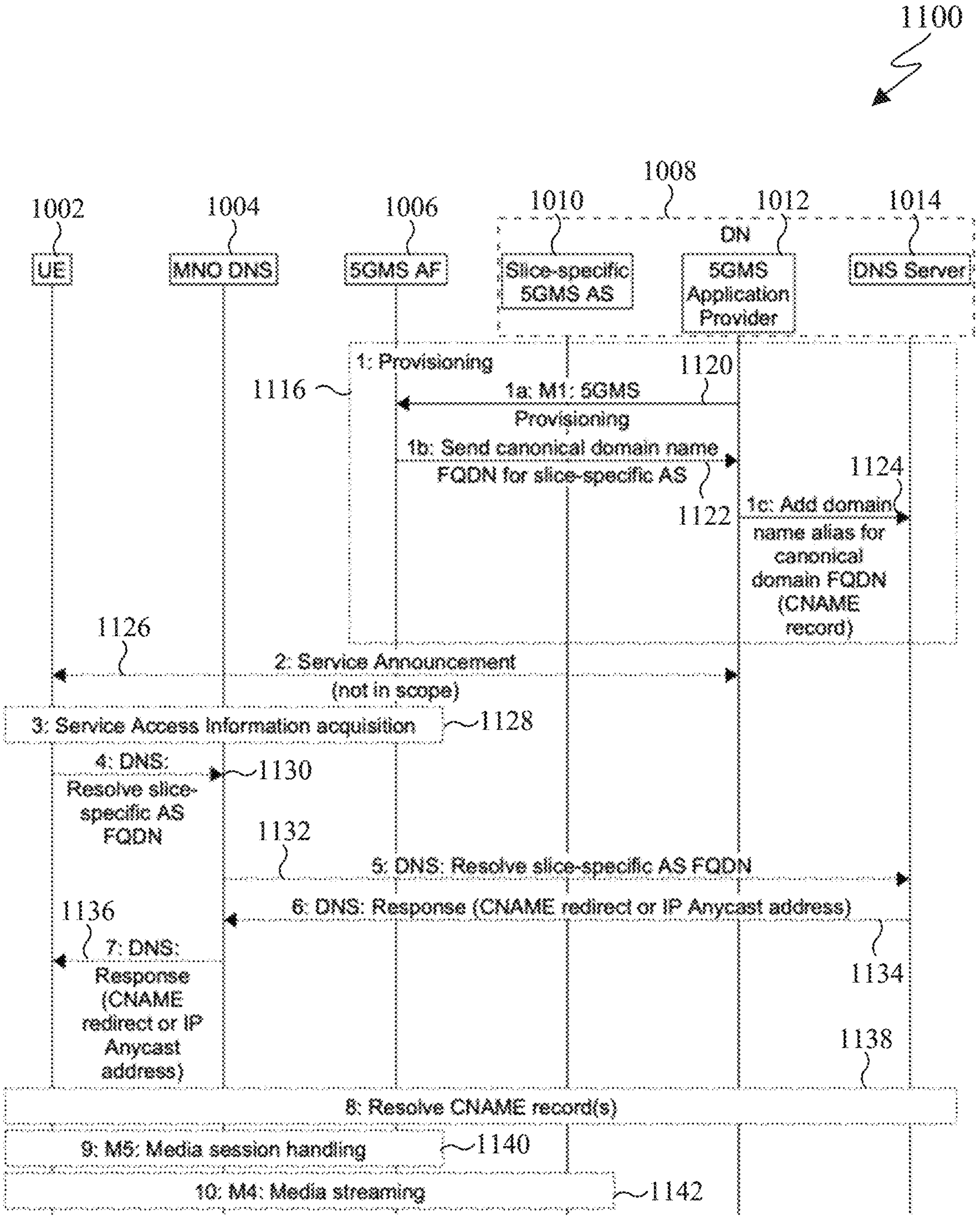
FIG. 11 illustrates an example procedure for domain name service-based resolution of slice-specific application server-instances when mobile network operator domain name service is authoritative in accordance with this disclosure.
Figure 12:
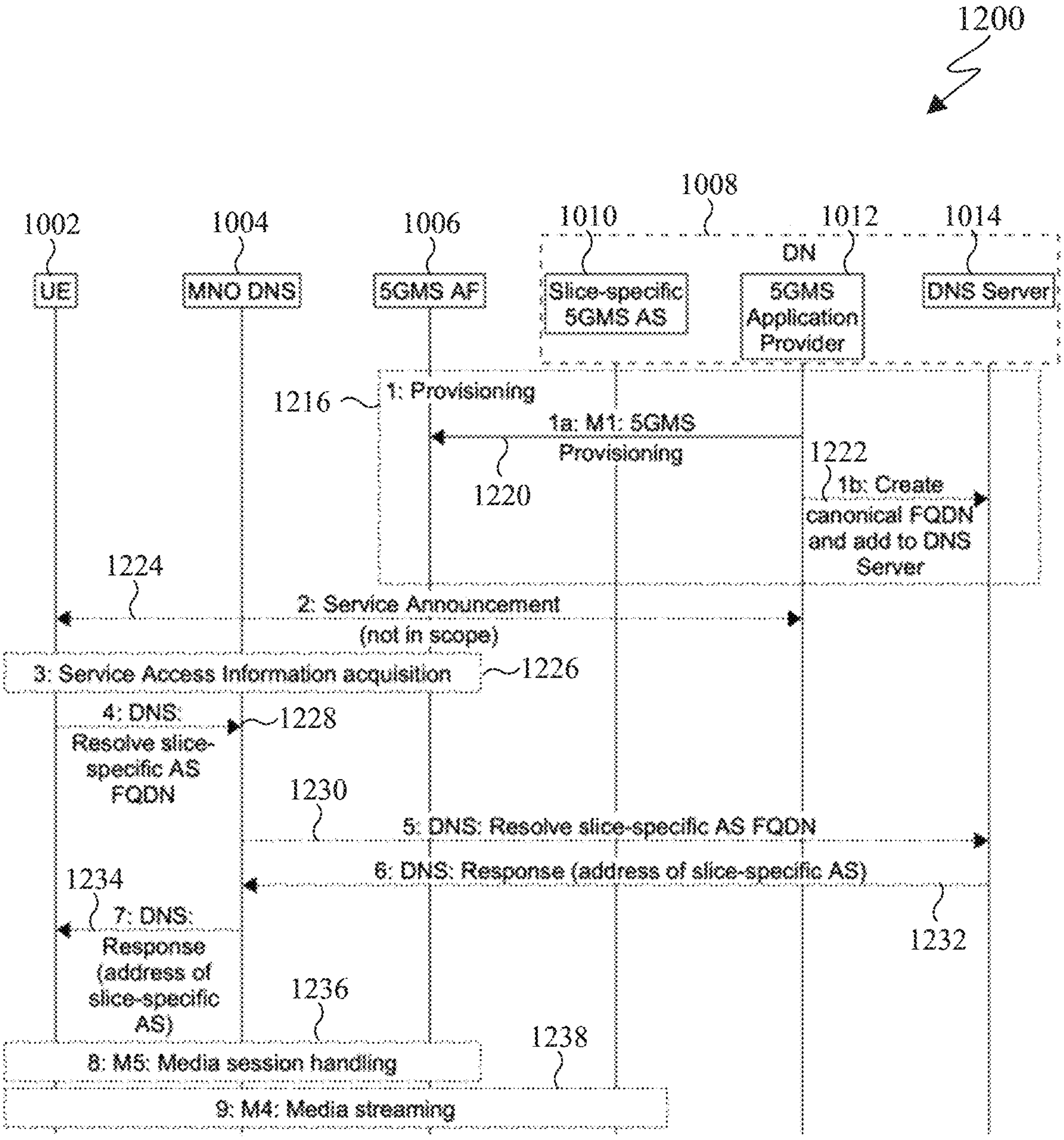
FIG. 12 illustrates an example procedure for domain name service based resolution of slice-specific application server-instances when a domain name service server in a data network domain is authoritative in accordance with this disclosure.

FIGS. 10-12 illustrate example procedures 1000-1200 for resolving slice-specific application service instances. The procedures involve a UE 1002, an MNO DNS 1004, an AF 1006, and a DN 1008 that includes a slice-specific AS 1010, an application provider 1012, and a DNS server 1014. The notion of network slicing specified by 3GPP is to enable sharing of RAN, core, and transport (sub-)networks to provide a logical instantiation of network called as a network slice instance. Communication services can be delivered through these network slice instances. However, the implementation of network slicing using the underlying network can be achieved through multiple ways e.g., using network technologies such as multi-protocol label switching (MPLS), virtual extensible local area network (VXLAN), layer 2 virtual private network (L2VPN), layer 3 virtual private network (L3VPN), and segment routing with IPv6 (SRV6). These network technologies provide the ability to create network overlays over the same underlying network infrastructure, thus enabling the creation of network slices.

3GPP specifies that network slice instances terminate at the user plane function (UPF), and the N6 subnet connecting the UPF to the data network (DN) is not part of a network slice instance. However, as described above, and in clause 4.3.2 of TS 23502, a PDU session association includes the N6 subnet into the DN. With a network slice 602 created using any of the network technologies above, routing table entries are available to forward traffic in the network slice to a destination in the DN. Therefore, an instance of a 5GMS application server (AS) 1010 in the DN is likely to be reachable from any network slice given the routing table entries are properly configured and DNS entries are populated correctly.

TS 26.501 describes procedures for download media streaming where the 5GMS application provider 1012 can configure a provisioning session using the M1 interface at the 5GMS AF 1006 and an ingest session using the M2 interface at the 5GMS AS 1010. With network slicing, the UE 1002 may have multiple PDU sessions operating, where the UE 1002 may receive content for a media service. Depending on the media service, different network slices 602 may provide different quality of service or packet treatment behaviour for media streams sent through those network slices 602. To enable media streaming through multiple network slices 602, one or more 5GMS ASs 1010 can serve different network slices 602. Traditional media streaming solutions include steps wherein the UE 1002 is informed of media streaming endpoint information of 5GMS ASs 1010 using media description documents (e.g., DASH MPD). With this information, the UE 1002 knows how to resolve the media streaming endpoints so the UE 1002 can request streaming media content from those 5GMS ASs 1010. However, with multiple possible 5GMS ASs 1010 serving different network slices 602, the issue remains that how a UE 1002 resolves the appropriate 5GMS AS 1010 for requesting media content.

FIG. 10 illustrates an example procedure 1000 for domain name service-based resolution of slice-specific application server-instances when mobile network operator domain name service is authoritative in accordance with this disclosure.

As shown in FIG. 10, The 5GMS application provider 1012 can configure a provisioning session 1016 at the 5GMS AF 1006 at reference point M1 at step 1020. The provisioning session configuration at the 5GMS AF 1006 is as described in clause 5 for downlink media streaming and clause 6 for uplink streaming as specified in TS 26501. The information about slice-specific AS 1010 is stored in the MNO DNS 1004 by the 5GMS AF 1006 in step 1022. The 5GMS AF 1006 is the authoritative owner of the DNS hostname. The fully qualified domain name (FQDN) of the slice-specific AS is sent to the 5GMS application provider 1012 for constructing service announcement information in step 1024.

The 5GMS application provider 1012 can provide service announcement information to the 5GMS-Aware Application in the UE at step 1026. The step is described in step 4 of clause 5.1 for downlink streaming and step 4 of clause 6.1 for uplink streaming in TS 26501. In the cases where the 5GMSd Client in UE 1002 received only a reference to the service access information, then UE 1002 can acquire the service access information from the 5GMS AF 1006 in step 1028. The acquisition of the service access information is described in step 6 of clause 5.1 of TS 26501. The 5GMS Client in the UE 1002 can resolve the slice-specific 5GMS AS information using DNS resolution methods at the MNO DNS 1004 in step 1030. The M5 media session handling procedure is then performed in step 1032. The M5 media session handling procedure is specified in step 7 of clause 5.1 for downlink media streaming and step 7 of clause 6.1 for uplink media streaming in TS 26501. The M4 media streaming procedures are then carried out in step 1034. The M4 media streaming procedures are specified in step 8 of clause 5.1 for downlink media streaming and step 8 of clause 6.1 for uplink media streaming in TS 26501.

Although FIG. 10 illustrates one example of a method 1000 for domain name service-based resolution of slice-specific application server-instances when mobile network operator domain name service is authoritative, various changes may be made to FIG. 10. For example, while shown as a series of steps, various steps in FIG. 10 may overlap, occur in parallel, or occur any number of times.

FIG. 11 illustrates an example method 1100 for domain name service-based resolution of slice-specific application server-instances when mobile network operator domain name service is authoritative in accordance with this disclosure.

As shown in FIG. 11, The 5GMS application provider 1012 can configure a provisioning session 1116 at the 5GMS AF 1006 at reference point M1 at step 1120. The provisioning session configuration at 5GMS AF is as described in clause 5 for downlink media streaming and clause 6 for uplink streaming as specified in TS 26501. The 5GMS AF 1006 can create a canonical domain name for slice-specific AS 1010 and send the canonical domain name to the 5GMS application provider 1012 in step 1122. The 5GMS application provider 1012 can create a host name alias to the canonical domain name (CNAME record), which is added into the DNS server 1014 of the DN 1008 in step 1124.

The 5GMS application provider 1012 can prepare service announcement information with host name alias and provide the service announcement information to the 5GMS-aware application in the UE 1002 in step 1126. The preparation and provision of the service announcement information is described in step 4 of clause 5.1 for downlink streaming and step 4 of clause 6.1 for uplink streaming in TS 26501.

In the case where the 5GMSd client in UE 1002 receives only a reference to the service access information, the UE 1002 can acquire the service access information from the 5GMS AF 1006 in step 1128. The acquisition of the service access information is described in step 6 of clause 5.1 of TS 26501. The 5GMS client uses an MNO DNS to resolve the a FQDN of slice-specific 5GMS AS 1010 in step 1130. The 5GMSd client can send a DNS request to the MNO DNS 1004. The MNO DNS 1004 may not be responsible for the host alias FQDN and can forward the DNS request to the DNS server 1014 in DN 1008 in step 1132.

Based on the information from the originating network, the DNS server 1014 in the DN 1008 can create a response and send the response to the MNO DNS 1004 in step 1134. The response may be a CNAME redirect (i.e. FQDN from the serving mobile network responsibility) or an IP address (preferably an IP anycast address). The MNO DNS 1004 can forward the DNS response to the 5GMSd client in the UE 1002 in step 1136.

When the 5GMSd client in the UE 1002 receives another FQDN with the response (i.e. CNAME DNS record), the UE 1002 can resolve the FQDN to an IP address in step 1138. The resolved IP address is the IP address of 5GMS AS 1010. The M5 media session handling procedure is performed in step 1140 The M5 media session handling procedure is specified in step 7 of clause 5.1 for downlink media streaming and step 7 of clause 6.1 for uplink media streaming in TS 26501. The M4 media streaming procedures are carried out in step 1142. The M4 media streaming procedures are specified in step 8 of clause 5.1 for downlink media streaming and step 8 of clause 6.1 for uplink media streaming in TS 26501.

Although FIG. 11 illustrates one example of a method 1100 for domain name service-based resolution of slice-specific application server-instances when mobile network operator domain name service is authoritative, various changes may be made to FIG. 11. For example, while shown as a series of steps, various steps in FIG. 11 may overlap, occur in parallel, or occur any number of times.

FIG. 12 illustrates an example method 1200 for domain name service based resolution of slice-specific application server-instances when a domain name service server in a data network domain is authoritative in accordance with this disclosure.

As shown in FIG. 12, the 5GMS application provider 1012 can configure a provisioning session 1016 at the 5GMS AF 1006 at reference point M1 at step 1220. The provisioning session configuration at 5GMS AF 1006 is as described in clause 5 for downlink media streaming and clause 6 for uplink streaming as specified in TS 26501. The 5GMS application provider 1012 can create a canonical domain name FQDN, which is added to the DNS server 1014 in the DN 1008 in step 1222.

The 5GMS application provider 1012 can prepare and provide service announcement information to the 5GMS-aware application in the UE 1002 in step 1224. The preparation and provision of service announcement information is described in step 4 of clause 5.1 for downlink streaming and step 4 of clause 6.1 for uplink streaming in TS 26501. In the case where the 5GMSd client in UE 1002 received only a reference to the service access information, then the UE 1002 can acquire the service access information from the 5GMS AF 1006 in step 1226. The acquisition of the service access information is described in step 6 of clause 5.1 of TS 26501.

The 5GMS client uses MNO DNS 1004 to resolve the FQDN of slice-specific 5GMS AS 1010. The 5GMSd client sends a DNS request to the MNO DNS 1004 in step 1228. The MNO DNS 1004 may not be responsible for the canonical domain name FQDN and can forward the DNS request to the DNS server 1014 in DN 1008 in step 1230. The DNS server 1014 in DN 1008 can create a response in step 1232. The response is the IP address of the slice-specific AS 1010. The MNO DNS 1004 can forward the DNS response with IP address of slice-specific AS 1010 to the 5GMSd client in the UE 1002 in step 1234.

The M5 media session handling procedure is then performed in step 1236. The M5 media session handling procedure is specified in step 7 of clause 5.1 for downlink media streaming and step 7 of clause 6.1 for uplink media streaming in TS 26501. The M4 media streaming procedures are then carried out in step 1238. The M4 media streaming procedures is specified in step 8 of clause 5.1 for downlink media streaming and step 8 of clause 6.1 for uplink media streaming in TS 26501.

Although FIG. 12 illustrates one example of a method 1200 for domain name service based resolution of slice-specific application server-instances when a domain name service server in a data network domain is authoritative, various changes may be made to FIG. 12. For example, while shown as a series of steps, various steps in FIG. 12 may overlap, occur in parallel, or occur any number of times.

Figure 13:
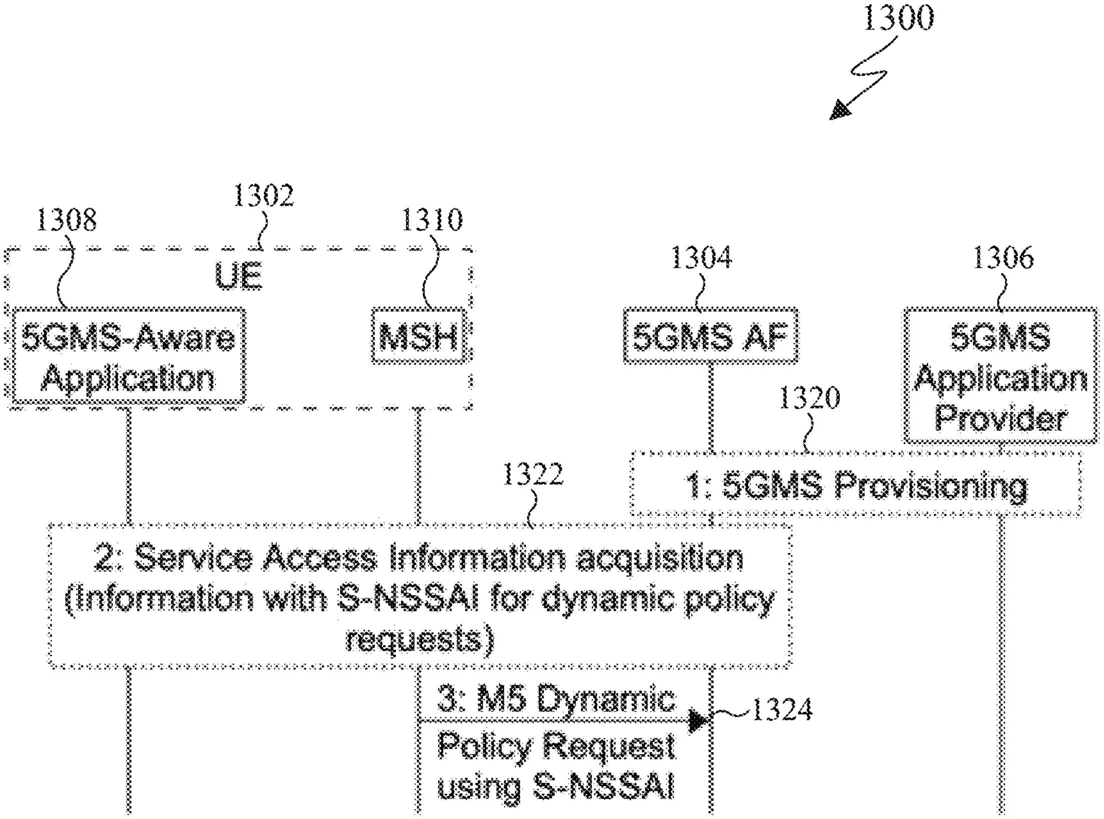
FIG. 13 illustrates an example procedure for using service access information to extract network slice selection assistance information (S-NSSAI) to use for outbound M5 dynamic policy requests in accordance with this disclosure.

FIG. 13 illustrates an example method 1300 for using service access information to extract S-NSSAI to use for outbound M5 dynamic policy requests in accordance with this disclosure. The method 1300 is implemented using a UE 1302, a 5GMS AF 1304, and a 5GMS application provider 1306, where the UE 1302 includes a 5GMS-aware application 1308 and a MSH 1310. The procedure 1330 provides for realizing dynamic policies using different network slice in slice selection for M5 dynamic policy requests.

Clause 5.3 of TS 26.501 describes a domain model for a provisioning session for media streaming and provides a high-level procedure for provisioning the 5GMS system for downlink media streaming sessions. One of the features offered by the 5GMS application provider 1306 as part of the provisioning session is the feature of dynamic policy. With this feature, the 5GMS application provider 1306 can specify a set of policies that can be invoked for downlink media streaming. The UE 1302 becomes aware of the policies in the form of a list of valid policy template Ids. Clause 4.7.3 of TS 26.512 describes detailed procedures for dynamic policy invocation that are invoked by the MSH 1310 using the M5 interface at the 5GMS AF. The information required by the MSH for invoking the dynamic policy requests becomes available from the Service Access Information that is obtained by the MSH either from the 5GMS-Aware Application (via M6) or from the 5GMS AF (via M5) as described in clause 4.7.2 of TS 26.512.

Clause 5.8 of TS 26.501 describes a procedure for dynamic policy based on network slicing for downlink media streaming. As part of this procedure, the 5GMS application provider 1306 can request assignment of one or more network slices for the distribution of the service, and the 5GMS AF 1304 can respond with a list of allowed S-NSSAIs. The procedure further details how the MSH 1310 and UE policy management in the UE 1302 can determine the network slice(s) 602 to be used for the provisioning session so media streaming can happen at M4.

Clause 11.2.3 of TS 26.512 specifies the data model for ServiceAccessInformation resource type that includes information for DynamicPolicyInvocationConfiguration information element. This information element is enhanced with slice information in table 3 using which the MSH 1310 can infer the slice to use for outbound M5 dynamic policy requests.

TABLE 3

| Property name | Type | Cardinality | Usage | Description | Applicability |
|---|---|---|---|---|---|
| DynamicPolicyInvocationConfiguration | Object | 0 . . . 1 | RO | | downlink, uplink |
| SliceInfo | S-NSSAI | 0 . . . 1 | RO | Slice identifier to use for outbound M5 dynamic policy requests | |

As shown in FIG. 13, the 5GMS application provider 1306 can configure a provisioning session at the 5GMS AF at reference point M1 in step 1320. The configuration of the provisioning session is described in clauses 5 and 6 of TS 26501.

The MSH 1310 can obtain service access information from either the 5GMS-aware application 1308 or 5GMS AF 1304 in step 1322. The obtaining of the service access information is described in steps 4 and 6 of clause 5.1 in TS 26501 for download streaming, or steps 4 and 7 of clause 6.1 in TS 26.501 for upload streaming. The service access information can include information about the S-NSSAI to use for outbound M5 dynamic policy requests. The MSH 1310 can invoke outbound M5 dynamic policy requests at the 5GMS AF 1304 using the S-NSSAI in step 1324.

Although FIG. 13 illustrates one example of a method 1300 for using service access information to extract S-NSSAI to use for outbound M5 dynamic policy requests, various changes may be made to FIG. 13. For example, while shown as a series of steps, various steps in FIG. 13 may overlap, occur in parallel, or occur any number of times.

Figure 14:
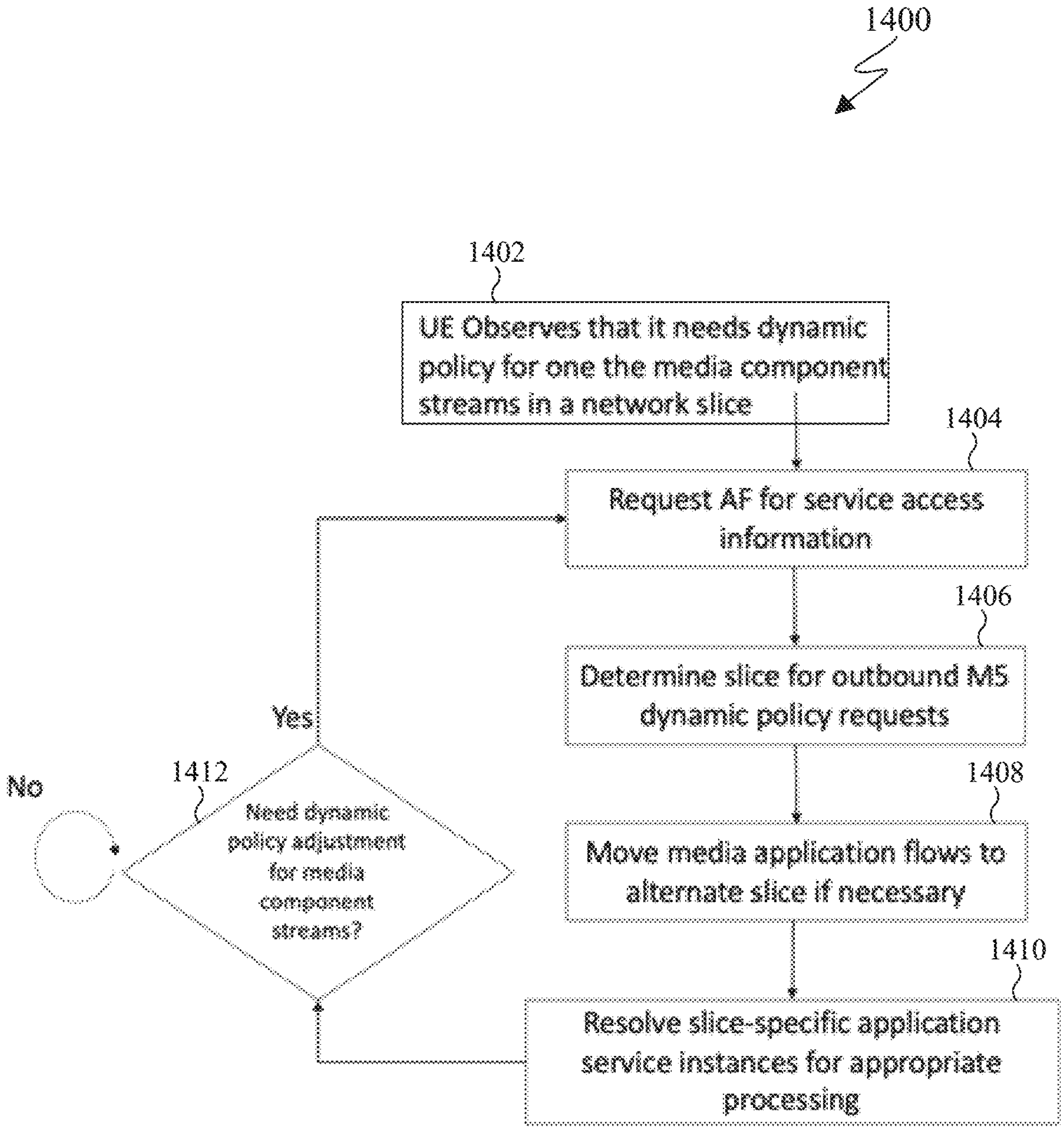
FIG. 14 illustrates an example method for slice management during a QoS-based dynamic policy in accordance with this disclosure.

FIG. 14 illustrates an example method for slice management during a QoS-based dynamic policy in accordance with this disclosure.

Media flows can be moved between different network slices. Clause 5.15.5.2.2 of TS 23.501 provides for determining whether ongoing traffic can be routed over other existing PDU sessions in other slices. The UE can use either URSP rules (which includes the NSSP) or a UE local configuration as defined in clause 6.1.2.2.1 of TS 23.503 to determine whether ongoing traffic can be routed over existing PDU Sessions belonging to other network slices or establish new PDU Session(s) associated with same/other network slice. Either the URSP rules delivered to the UE or the UE local configuration can define how ongoing traffic can be routed over existing PDU Sessions belonging to other network slices.

Clause 6.6.2 of TS 23.503 describes UE Route Selection Policy (URSP) information. As part of URSP, a set of traffic descriptors that help identify application flows are specified. Also specified are a list of route selection descriptors that define how the identified flows to be routed through the 5G system. Table 4 is an extract from Table 6.6.2.1-3 of TS 23.503 about slicing related entries in the Route Selection Descriptor of URSP

TABLE 4

| Information name | Description | Category | PCF permitted to modify in URSP | Scope |
|---|---|---|---|---|
| Route selection components | This part defines the route selection components | Mandatory (NOTE 2) | | |

TABLE 4-continued

| Information name | Description | Category | PCF permitted to modify in URSP | Scope |
|---|---|---|---|---|
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |

. . .
NOTE 3:
When the Subscription Information contains only one S-NSSAI in UDR, the PCF needs not provision the UE with S-NSSAI in the Network Slice Selection information. The "match all" URSP rule has one S-NSSAI at most.
. . .

From table 4, one of the route selection components is the network slice selection information which is either a single value or a list of values of S-NSSAIs, which defines the NSSP. When this information is present in the URSP rules delivered to the UE by the PCF, the UE can route the identified application traffic through the slices identified by the NSSP. It is to be noted that the network slice selection information can be a list of S-NSSAIs, but the specification does not specify how the identified application traffic can be moved between the slices.

For UE local configuration, clause 6.1.2.2.1 of TS 23.503 describes UE policy control and specifies that among two among the four policy objects may be pre-configured in the UE. The four policy objects can include access network discovery & selection policy (ANDSP), UE Route Selection Policy (URSP), V2X Policy (V2XP), and ProSe Policy (ProSeP). ANDSP and URSP are the two policy objects pre-configured in the UE.

Clause 7.9 of TS 26.512 specifies policy templates provisioning API using an 5GMS application provider that configures a set of policy templates within the scope of the provisioning session that can be subsequently applied to downlink or uplink media streaming sessions. A policy template is identified by its policyTemplateId and represents a set of PCF/NEF parameters which define the service quality and associated charging for the corresponding downlink or uplink media streaming sessions. Also specified is the policy template used for QoS Flows the M1QOSSpecification is included as per the specification. As specified in Table 6.4.3.2-1 of TS 26512, the M1QoSSpecification includes properties such as maximum bit rate for uplink and downlink, maximum authorized bit rate for uplink and downlink by 5GMS application provider, and default packet loss rates for uplink and downlink.

In addition to the above, the data model for policy template resources includes the ApplicationSessionContext information element which provides information about "sliceInfo" and "dnn" information sub-elements that represent the slice and DNN for which the policy template is applicable. The data model for policy template resource is specified in clause 7.9.3.1.

When a UE needs the support for dynamic policy, the UE can create a dynamic policy request to the 5GMS AF. Clause 11.5 of TS 26.512 describes the M5 dynamic policies API that allow the media session handler to request a specific policy and charging treatment to be applied to a particular application data flow of a downlink or uplink media session. As part of the request, as specified in clause 11.5.3 of TS 26512 describing data model of DynamicPolicy resource, among a set of parameters, the policyTemplateId and M5QoSSpecification information is sent by the MSH to the 5GMS AF. The policyTemplateId is the same Id that the 5GMS application provider configured using the M1 API above and is informed to the UE during the M5 Service Access Information API as specified in clause 11.2 of TS 26512. The M5QoSSpecificaiton represents the requested QoS, specified in clause 6.4.3.3 of TS 26512, and is very similar to the structure of MIQOSSpecification.

The UE application flows can be migrated to a different network slice to achieve the required QoS for the downlink or uplink session. The following solution options are feasible for defining how to move media flows between different network slices.

The first option is implementation dependent. Leave defining how to move media flows between different network slices to the UE to figure out which application flows in a given network slice are to be moved to a different network slice. Table 5 provides possibilities when it is left to UE implementation.

TABLE 5

| Method | Description |
|---|---|
| Use default-configured-NSSAI | Use the slice that corresponds to default configured NSSAI for transferring the media flows if the current slice cannot satisfy QoS requirements<br>The default configured NSSAI is configured by the network for the UE. |
| Use default slice | A slice is configured as the default slice by the application service provider, and the application function conveys this information to the UE. When UE receives this information, it uses this slice for transferring media flows for which the requested QoS dynamic policy cannot be applied. |
| Slice-priority-map | Map of slice priorities if there are multiple slices that can be used for moving the application media flows to. Each entry in the map is a key-value pair for which the key value is the S-NSSAI of the slice, and value represents the relative priority of that slice among all the slices.<br>When this information is provided to the UE, the UE can use the slice whose S-NSSAI has the highest priority in the priority map. If that slice cannot provide the requested QoS, then the slice with next highest priority can be used to move the application media flows to. |

The second option is to enhance NSSP of URSP: With this option, enhance existing NSSP of URSP to indicate the network slice that the UE can migrate an application flow to if the requested dynamic policy cannot be provided by the current slice. The NSSP of URSP policy defined in TS 23.503 can be enhanced with the fall-back slice information and slice-priority-map information.

The fallback-slice information can be a field with certain S-NSSAI as the fall-back slice in case the current slice cannot deliver the requested QoS for the media flows. With this option, when the requested QoS cannot be provided by the current slice, the media flows in the current slice are moved to the slice with the S-NSSAI value corresponding to the above field.

The slice-priority-map information can include slice-priority-map as defined earlier to provide the priority information of each slice that can be used to move the media flows to. The slice with the highest priority can be tried first before trying the slice with the next highest priority.

The third option is to enhance M5 APIs. The M5 Service Access Information data model described in clause 11.2.3 of TS 26512 can be enhanced to include a network slice (e.g., with field "fall-back slice") that the media flow in a current network slice can be migrated to if requested dynamic policy cannot be provided by the current slice.

If there are multiple network slices, the slice priority map defined earlier can be exchanged using the service access information API. When the network provides such a priority map, the UE comes to know the relative priority of slices to be used to migrate the media flows from a slice if that slice cannot guarantee the requested QoS dynamic policy.

The M5 dynamic policies API specified in clause 11.5 of TS 26512 can be enhanced to include the slice information (e.g., with field "fall-back-to-slice" and value corresponding to the S-NSSAI of the slice) to which the MSH intends to migrate the media flow to. When the application function receives this information, The MSH can ensure the media flows reach the appropriate application service instances by updating the routing information inside the MNO network and DN network.

As shown in FIG. 14, The UE can determine that a dynamic policy adjustment is needed for one the media component streams in step 1402. The UE can request service access information from the AF in step 1404. The service access information allow for creation of dynamic policy requests. Upon receiving this request from the UE, the AF can reply with service access information.

The UE can determine the slice for outbound M5 dynamic policy requests in step 1404. The determination of the slice can be performed using the methods described above. The UE can make a dynamic policy request to the AF to adjust QoS for the media component streams. As a result of this operation, the UE moves the media application flows to a different network slice in step 1408. The relocation of the media application flow to a different network slice can be performed using a method described above. Once an alternate slice is determined, the UE can use the resolution method(s) to determine slice-specific application service instances and sends the media flows to that instance using the determined slice in step 1410.

The UE can continue to check if it needs dynamic policy adjustment for media component streams in step 1412. If no adjustment is needed, the current slices will be continued to be used for media streaming. Alternately, if the UE determines that it needs dynamic policy adjustment to one or more the media component streams, the UE can perform steps 1404-1410 again. These operations are performed for each media component stream in the media service.

The UE can also reject or limit movement of media flows to different network slices. To enable rejection of moving media flows to different network slices, a Boolean flag in the service configuration can be set to deny movement of media flows to different network slices, a deny-slice list can be generated, and a limit slice migration map can be generated.

For the Boolean flag in the service configuration can be set to deny movement of media flows to different network slices, the application service provider, while configuring the media service with one or more network slices, can send a simple Boolean flag (e.g., "deny-flow-moving-because-of-dynamic-policy" set to True) in a configuration message to tell the application function that any such moves of media flows to different slices is denied. The application function can enforce such a configuration and deny any move of application flows to different slices because of insufficient QoS during dynamic policy procedures.

For the deny slice list, the application service provider can send a deny-slice-list in a service configuration message to the application function indicating the list of slices for which the constituent media application flows to be denied migration to alternate network slices because of dynamic policy procedures.

For the limit slice migration map, the application service provider can send a limit-slice-migration-map in service configuration message to the application function. Each entry in this map is a key-value pair where key represents the slice Id (e.g., S-NSSAI) and value represents a list of slice-Ids to which the media flows in the slice represented by key value can be migrated to i.e. only the flows in slice corresponding to key value can be migrated to any of the slices in the list of slice Ids represented by the value parameter.

The UE can also determine a slice selection when multiple slices are available. The service access information can be enhanced to include a slice-priority-map when there are multiple network slices that the UE can use. The slice-priority map can have a key-value pair, where the key represents the slice Id (e.g., S-NSSAI) that the UE has a current PDU session with, and the value represents the relative priority of that slice among all the available slices that the UE has current connection. When this priority map is delivered to the UE using the service access information, the UE can try the slice with the highest priority to use for outbound M5 dynamic policy requests. If cannot reach the AF through that slice, the UE can attempt to send the dynamic policy request through the slice with the next highest priority.

Although FIG. 14 illustrates one example of a method 1400 for slice management during a QoS-based dynamic policy, various changes may be made to FIG. 14. For example, while shown as a series of steps, various steps in FIG. 14 may overlap, occur in parallel, or occur any number of times.

Figure 15A:
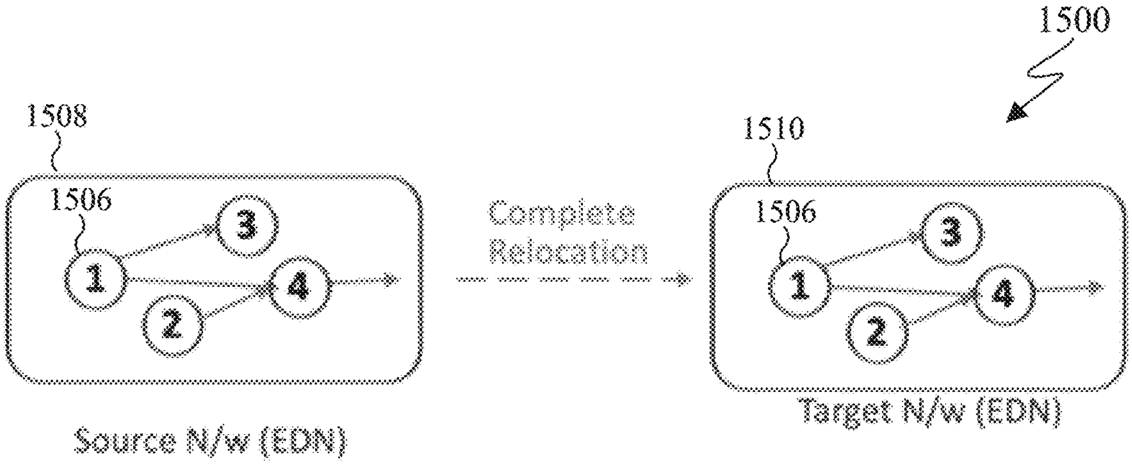
FIGS. 15A and 15B illustrate example workflow relocations in accordance with this disclosure.
Figure 15B:
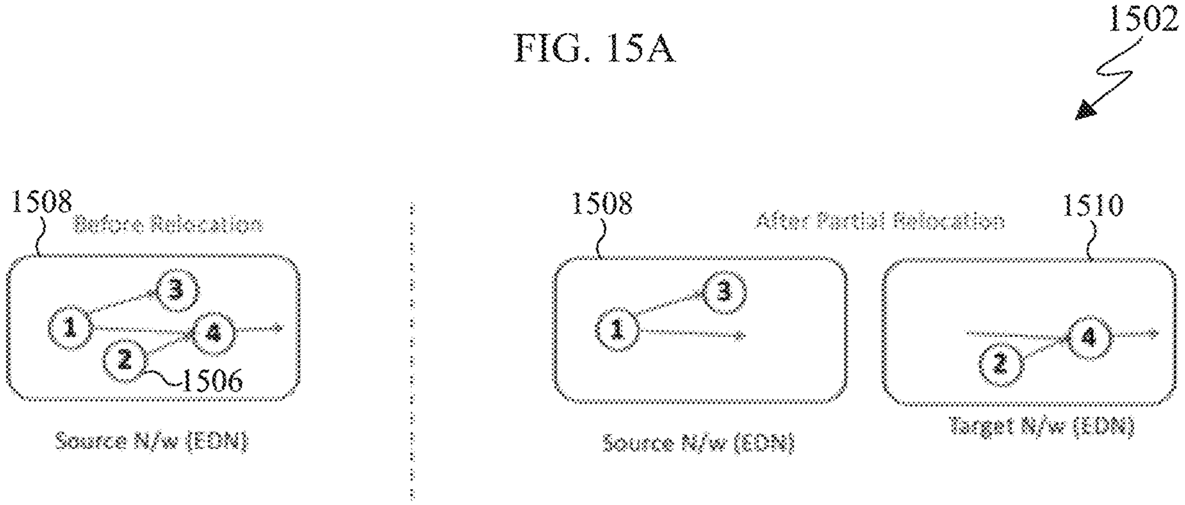

FIGS. 15A and 15B illustrates example workflow relocations 1500-1504 in accordance with this disclosure. The embodiments of the workflow relocations 1500-1504 illustrated in FIGS. 15A and 15B are for illustration only. FIGS. 15A and 15B do not limit the scope of this disclosure to any particular implementation of an electronic device.

As shown in FIG. 15A, a complete workflow relocation 1500 transfers all the application service components 1506 that are part of the workflow running inside the source network 1508 to the target network 1510. The application service components 1506 of the workflow (components 1, 2, 3, and 4) in the source network 1508 are moved to the target network 1510. All configuration of the application service components 1506, properties of network paths, and expected key performance indicators (KPIs) can be migrated to the target network 1510 as is. With this kind of deployment, relocating the application service components 1506 is seamless and the performance of the application will closely resemble the performance when all the application service components 1506 are in the source network 1508 provided appropriate resources are provisioned in the target network 1510 based on expected KPI.

As shown in FIG. 15B, a partial workflow relocation 1502 can transfer a subset of the application service components 1506 that are part of the workflow running in the source network 1508 to the target network 1510. With the partial workflow relocation 1502, a subset of application service components 1506 of the workflow (components 2 and 4) in the source network 1508 are moved to the target network 1510 and the rest of the application service components 1506 (components 1 and 3) can remain in the source network 1508.

Although FIGS. 15A and 15B illustrate example workflow relocations, various changes may be made to FIGS. 15A and 15B. For example, the number and placement of various components of the workflow relocations 1500-1504 can vary as needed or desired. In addition, the workflow relocations 1500-1504 may be used in any other suitable network slicing process and is not limited to the specific processes described above.

Figure 16:
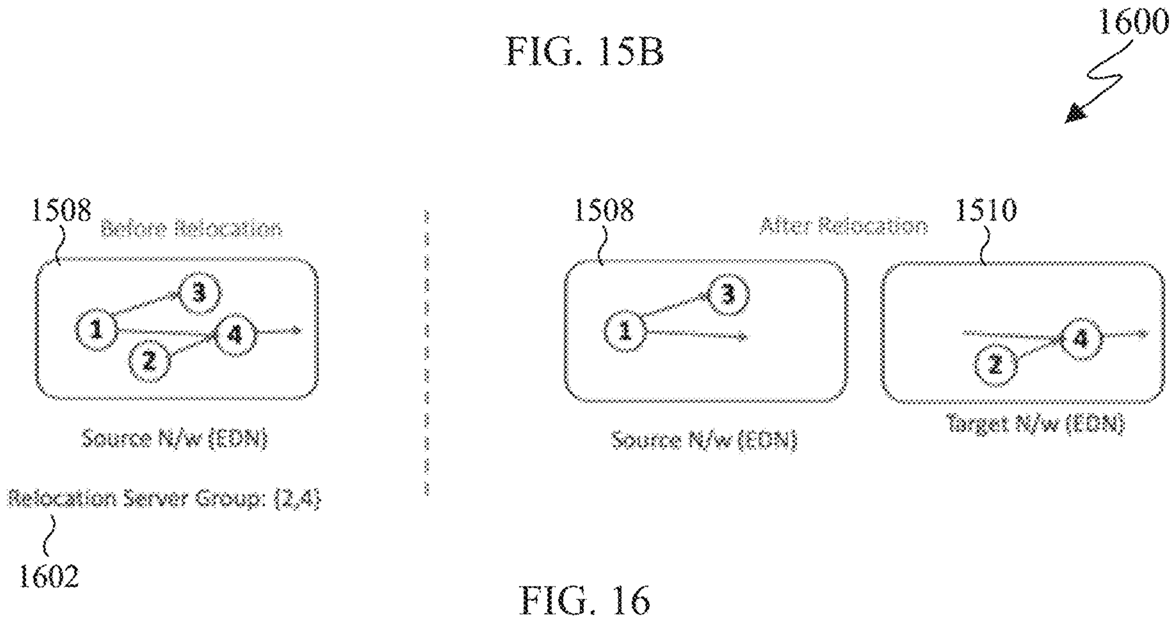
FIG. 16 illustrates an example server group relocation in accordance with this disclosure.

FIG. 16 illustrates an example server group relocation 1600 in accordance with this disclosure. The embodiment of the server group relocation 1600 illustrated in FIG. 16 is for illustration only. FIG. 16 does not limit the scope of this disclosure to any particular implementation of an electronic device.

As shown in FIG. 16, server group relocation 1600 can be used to transfer application service components 1506 that have functional dependencies. Some application service components 1506 within a workflow have close dependency with other application service components 1506 in the workflow. The close dependency could be due to a number of reasons such as performance, security, compliance, etc. With close dependency when there are functional dependencies between different application service components 1506 in the workflow and if a decision is made to relocate one or more application service components 1506, then the dependent application service components 1506 can also be relocated.

Before server group relocation, application servers 2 and 4 are part of a relocation server group 1602. If a decision is made by the application manager, AF, UE, or ASP to relocate server 2, then the dependent server 4 is also relocated along with server 2. If the dependent application service component 1506 cannot be relocated for any reason, then the application service components in the relocation server group 1602 may not be relocated.

For multiple relocation server groups 1602 within a workflow, the ASP configures the relocation server groups 1602 as part of the service provisioning procedure. When a decision to relocate an application service component 1506 is made, all the relocation server groups 1602 in which the currently to-be-relocated application service is found to a member of, is examined to see all the dependency relationships between other application service components 1506 in the workflow, and a decision is taken to relocate all those dependent application service components 1506 as well. If the dependent application servers components 1506 cannot be relocated, the application service provider can determine whether only the current to-be-relocated application service component can be relocated individually.

Although FIG. 16 illustrates an example server group relocation, various changes may be made to FIG. 16. For example, the number and placement of various components of the server group relocation 1600 can vary as needed or desired. In addition, the server group relocation 1600 may be used in any other suitable network slicing process and is not limited to the specific processes described above.

Figure 17A:
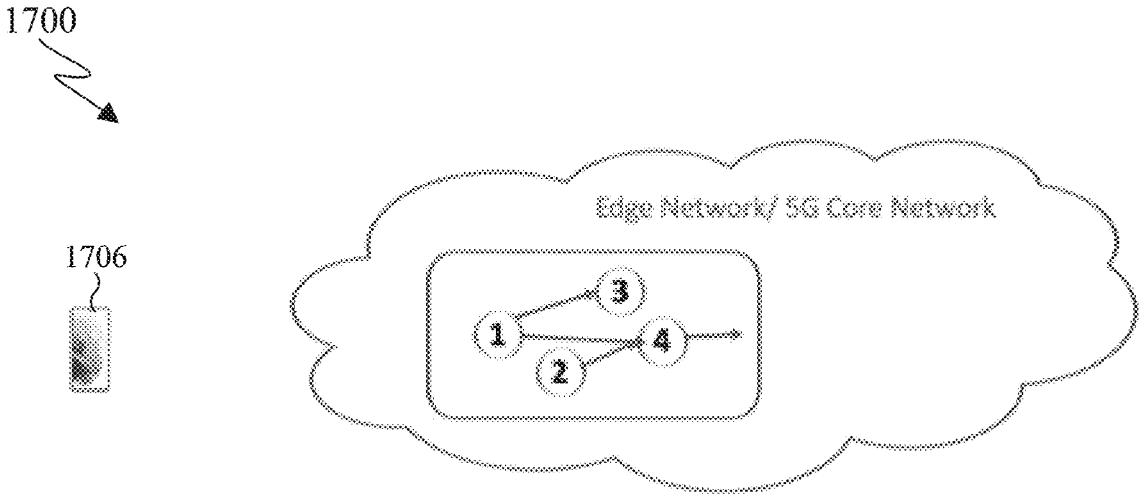
FIGS. 17A through 17C illustrate example workflow relocations to a user equipment in accordance with this disclosure.
Figure 17B:
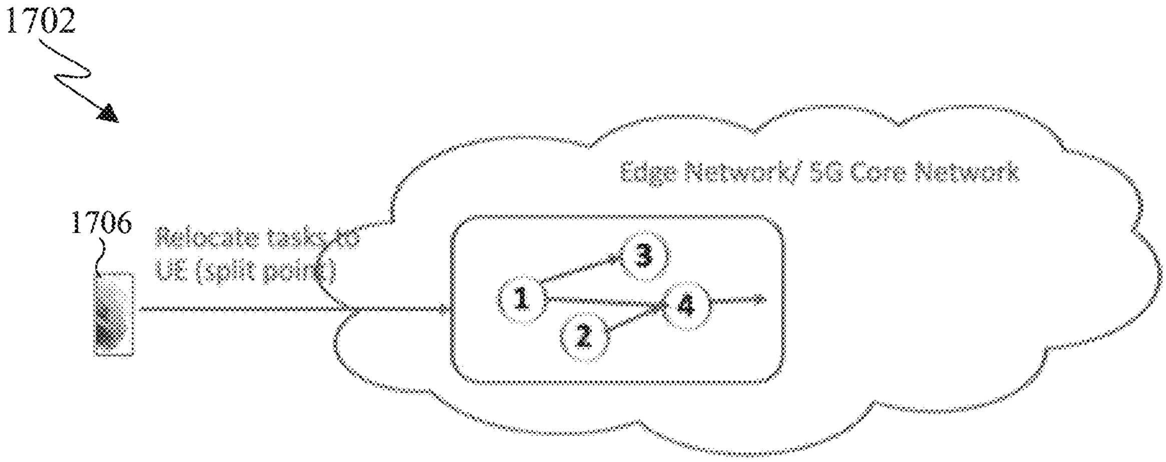
Figure 17C:
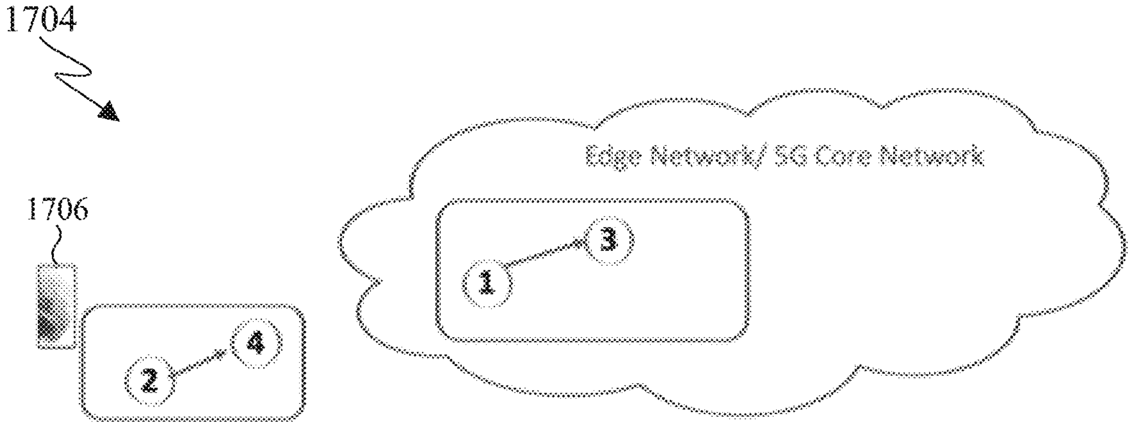

FIGS. 17A through 17C illustrate example workflow relocations 1700-1604 to a user equipment in accordance with this disclosure. The embodiments of the workflow relocations 1700-1604 illustrated in FIGS. 17A through 17C are for illustration only. FIGS. 17A through 17C do not limit the scope of this disclosure to any particular implementation of an electronic device.

As shown in FIGS. 17A through 17C, application service components 1506 can be moved by a UE 1706 workflow relocation. A UE 1706 can receive the workflow description from the AF that is managing the session or the application manager in the source network. Based on expectation of certain conditions (e.g., UE 1706 can move to a different location in some time), the UE 1706 can request the AF that is managing the session to do a workflow relocation. To request relocation of workflow, the UE 1706, using an M5d interface shown in FIG. 4, can send an API request for workflow relocation to a target location. As part of the API request, following information elements in TABLE 6 can be provided to the AF.

TABLE 6

| Information element | Description |
|---|---|
| Workflow Id | Workflow Identifier in case the workflow identifier was sent to the UE 1706 instead of the complete workflow description. Even in case the complete description of workflow was shared with UE 1706, the UE 1706 can still provide just the Workflow identifier to the AF |
| Workflow profile information | Detail workflow profile information of the workflow in case the profile information was shared to the UE 1706, and the UE 1706 wishes to share the entire information |
| Reduced application service component list | A subset of application service components to be relocated instead of the complete workflow |
| Reduced connection map | Connection map with detail links, link properties, and KPIs of network links interconnecting different application service components in the Reduced application service component list |
| Expected KPIs post relocation | KPIs expected post workflow relocation. The expected KPIs can be higher or lower than the KPIs available currently to the session. The list of KPI parameters could include:<br>Application latency<br>Throughput<br>Bandwidth<br>Packet error rate<br>Reliability<br>Coverage<br>KPIs currently available to the UE session can be informed to the UE 1706 by the AF that is managing the session |
| Location at Time period | Expected location of the UE 1706 at the time period when the relocation can start |
| Time period | Time when the relocation can start |
| Relocation trial interval | Time interval for which the target network 1510 should wait for traffic from the UE 1706 after the given time period. |
| List of Application Data Descriptors | Intermediate data of application service components so execution can resume instead of restarting after relocation<br>Each member of the list is a descriptor of application data corresponding to an application service component in the workflow. Application data for each application service component can have the following information:<br>Intermedia configuration data: Configuration information corresponding to the different variables and parameters of the application service component that may have changed during the course of execution of the application service component.<br>Binary app data: Application data corresponding to the execution data of application service component<br>Log data: All logging information related to application service component that may have to be made available in the target network 1510 after relocation |
| Callback-endpoint-details | Endpoint details of the UE 1706 in case AF needs to send optional data to the UE 1706 that the UE 1706 can use for further processing |

When the AF that is managing the session gets the API request with above information elements, the AF can attempt to do the workflow relocation provided the KPIs in the API can be satisfied. If the KPIs can be satisfied, the AF can communicate with the appropriate target network 1510 closer to the expected location of the UE 1706 at the given relocation time period. The AF can send the detail workflow profile information to the application manager in the target network 1510 to instantiate different application service components and necessary network paths so services can be up and running before the relocation can happen. Once the relocation time period approaches, the target network 1510 can wait for a time period indicated in a "relocation trial interval" to see if UE traffic reaches the target network 1510. If the UE 1706 traffic arrives in the target network 1510 before the expiry of the above relocation trial interval, then the relocation attempt is considered successful, and session should continue as expected. On the other hand, if the UE 1706 traffic does not arrive within the above relocation trial interval time period, then the relocation condition did not evaluate (e.g., UE 1706 may have decided not to change location after sending the API request to the AF). In this case, the relocation resources can be terminated.

The UE 1706 can request relocation of workflow resources to a target network 1510 when the UE 1706 receives the workflow profile information. Alternatively, the UE 1706 may have certain processing capabilities which the UE 1706 can take advantage of workflow processing. In this case, the UE 1706 may be interested in (e.g., authorized by end user through some action), or provisioned to do certain processing of the workflow for the media service. As a result, the UE 1706 may request onloading of certain processing tasks of the workflow onto the device, and thereby helping the end-to-end processing of the workflow. With this facility, some of the application service components that were originally run in the network (e.g., cloud, edge etc.) can now run in the UE 1706 to utilize processing UE 1706 capabilities.

To onload some processing tasks of the workflow, the UE 1706 can exchange the same information elements over the M5d interface to the AF that is managing the session. However, in this case, the semantics of the some of the fields are as described below.

A reduced application service component list field can represent a list of application service components that the UE 1706 is willing to run on the device. Hence any related processing of these application service components can now be freed in the network.

A list of application data descriptors field serves as pointers to structures that the AF can fill the data in before allowing the tasks to be run in the UE 1706. The child elements of this information element shall be used as intermediate configuration data, binary app data, and log data.

The Intermediate configuration data provides current configuration data for the tasks running in the network before moving the tasks to the UE 1706. When the application service components are moved to run in the UE 1706, this configuration data shall be used to configure the application service components.

The binary app data provides application data corresponding to the execution data of the application service components running in the network. When the application service components are relocated to UE 1706, the binary app data can be used by the application service components to continue their execution, instead of restarting the components execution.

The log data includes logging information related to application service components that were running in the network before the application service components are decided to be relocated to UE 1706. When the application service components are relocated to UE 1706, the log data can be used for important tasks (e.g., tracing).

Determining a split point of network processing is one of the evolving problems in AI. With the above structure, the UE 1706 can signal the split point of processing to the network so the UE 1706 can indicate certain parts of the processing in the device, thereby onloading some of the processing in the network (cloud).

Although FIGS. 17A through 17C illustrate example workflow relocations, various changes may be made to FIGS. 17A through 17C. For example, the number and placement of various components of the workflow relocations 1700-1604 can vary as needed or desired. In addition, the workflow relocations 1700-1604 may be used in any other suitable network slicing process and is not limited to the specific processes described above.

Figure 18:
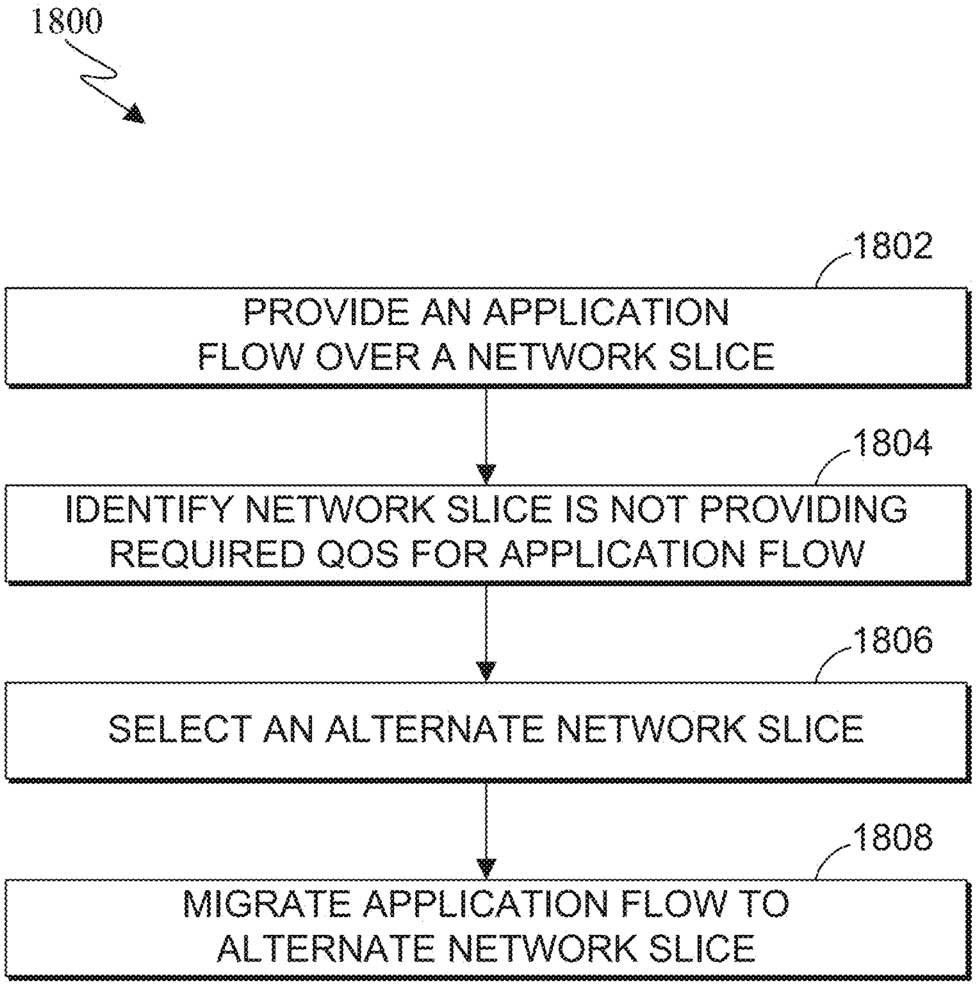
FIG. 18 illustrates an example method for policy management in media applications using network slicing according to this disclosure.

FIG. 18 illustrates an example method 1800 for policy management in media applications using network slicing according to this disclosure. For ease of explanation, the method 1800 of FIG. 18 is described as being performed using the electronic devices of FIGS. 2 and 3. However, the method 1800 may be used with any other suitable system and any other suitable electronic device.

As shown in FIG. 18, the electronic device provides an application flow over a network slice at step 1802. A first network flow of a plurality of network flows can be provided over a first network slice of a plurality of network slices. The plurality of network flows for a media application can include a network flow for each device of an immersive experience. Examples of devices used for immersive experiences can include headsets, gloves, vests, boots, suits, etc.

The electronic device identifies a network slice is not providing a required QoS for an application flow at step 1804. The first network slice can be identified as not providing a required QoS for the first application flow. Each device can have one or more application flows provided over separate network slices for the immersive experience. Each application flow has a required QoS based on the type of data and the immersive experience. When the network slice providing a specified application flow cannot meet the required QoS, the application flow begins to degrade the quality of the immersive experience.

The electronic device selects an alternate network at step 1806. In response to identifying that the first network slice is not providing a required QoS for the first application flow, an alternate network slice is selected based on a capability of the alternate slice to provide (i) the required QoS for the first application flow and (ii) an application service instance of the first application flow.

The electronic device can receive a list of application flows that cannot be migrated. The alternate network slice is checked against the list of application flows that cannot be migrated prior to migrating the application flow. If the application flow is in the list of application flows that cannot be migrated, the alternate network slice is not selected. If the application flow is not in the list of application flows that cannot be migrated, the alternate network slice is selected. The alternate network slice is also checked against a deny slice list before selection.

When multiple alternate network slices are able to provide the required QoS for the first application flow and the application service instance for the first application flow, the alternate network slice is selected from multiple alternate slices. A default network slice can be indicated by a NSSAI or an application service provider. The default network slice is selected as the alternate slice for migration. A slice priority maps can be generated for the multiple alternate slices that are able to provide the required QoS for the first application flow and the application service instance for the first application flow. Each entry in the slice priority map is a key value pair including a slice identification (ID) and a priority value that represents a relative priority of a specified slice among the multiple alternate slices. A fallback slice can be defined as part of a network slice selection policy for selecting the alternate network slice.

When the alternate network slice does not satisfy the QoS of the first application flow, a new network slice can be created for providing a QoS that satisfies the required QoS of the first application flow. When an alternate network slice does not satisfy the QoS of the first application flow and a new network slice cannot be created to satisfy the QoS of the first application flow, a new network slice can be created that provides a QoS within a predetermined offset from the require QoS of the first application flow.

The electronic device migrates the application flow to the alternate network slice at step 1808. The application flow can persist on the alternate network slice until the network slice can no longer provide the required QoS or the media application ends.

Although FIG. 18 illustrates one example of a method 1800 for policy management in media applications using network slicing, various changes may be made to FIG. 18. For example, while shown as a series of steps, various steps in FIG. 18 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:

providing, via a communication interface, a plurality of application flows over a plurality of network slices, wherein a first application flow is provided over a first network slice;

identifying, via processor operably coupled to the communication interface, that the first network slice is not providing a required quality of service (QoS) for the first application flow;

in response to identifying that the first network slice is not providing the required QoS for the first application flow, selecting an alternate network slice based on a capability of the alternate network slice to provide (i) the required QoS for the first application flow and (ii) an application service instance of the first application flow;

determining whether the alternate network slice satisfies the required QoS of the first application flow;

in response to a determination that the alternate network slice does not satisfy the required QoS of the first application flow, creating a new network slice providing a QoS that satisfies the required QoS of the first application flow; and in response to a determination that the alternate network slice satisfies the required QoS of the first application flow, migrating the first application flow to the alternate network slice.

2. The method of claim 1, further comprising:

receiving, via the communication interface, a list of application flows that cannot be migrated, wherein selecting the alternate network slice comprises determining that the first application flow is not in the list of application flows.

3. The method of claim 1, wherein when multiple alternate network slices are able to provide the required QoS for the first application flow and the application service instance for the first application flow, selecting the alternate network slice comprises selecting the alternate network slice from the multiple alternate slices.

4. The method of claim 3, wherein selecting the alternate network slice comprises identifying a default network slice indicated by a network slice selection assistance information (NSSAI) or an application service provider.

5. The method of claim 3, further comprising:

generating a slice priority map for the multiple alternate slices that are able to provide the required QoS for the first application flow and the application service instance for the first application flow.

6. The method of claim 5, wherein each entry in the slice priority map is a key value pair including a slice identification (ID) and a priority value that represents a relative priority of a specified slice among the multiple alternate slices.

7. The method of claim 3, wherein selecting the alternate network slice comprises identifying a fallback slice defined as part of a network slice selection policy as the alternate network slice.

8. The method of claim 1, wherein the required QoS of the first application flow for the new network slice is a QoS within a predetermined offset from the required QoS of the first application flow.

9. The method of claim 1, wherein the alternate network slice is not in a deny slice list.

10. The method of claim 8, further comprising:

identifying the offset for the QoS from a parameter offset table indicating an offset for each parameter in a QoS specification.

11. An apparatus comprising:

a communication interface; and a processor operably coupled to the communication interface, the processor configured to:

provide a plurality of application flows over a plurality of network slices, wherein a first application flow is provided over a first network slice;

identify that the first network slice is not providing required quality of service (QoS) for the first application flow;

in response to identifying that the first network slice is not providing required QoS for the first application flow, select an alternate network slice based on a capability of the alternate network slice to provide (i) the required QoS for the first application flow and (ii) application service instance of the first application flow;

determine whether the alternate network slice satisfies the required QoS of the first application flow;

in response to a determination that the alternate network slice does not satisfy the required QoS of the first application flow, create a new network slice providing a QoS that satisfies the required QoS of the first application flow; and in response to a determination that the alternate network slice satisfies the required QoS of the first application flow, migrate the first application flow to the alternate network slice.

12. The apparatus of claim 11, wherein:

the communication interface is configured to receive a list of application flows that cannot be migrated, and to select the alternate network slice, the processor is configured to determine that the first application flow is not in the list of application flows.

13. The apparatus of claim 11, wherein, when multiple alternate network slices are able to provide the required QoS for the first application flow and the application service instance for the first application flow, to select the alternate network slice, the processor is configured to select the alternate network slice from the multiple alternate slices.

14. The apparatus of claim 13, wherein, to select the alternate network slice, the processor is configured to identify a default network slice indicated by a network slice selection assistance information (NSSAI) or an application service provider.

15. The apparatus of claim 13, wherein the processor is further configured to generate a slice priority map for the multiple alternate slices that are able to provide the required QoS for the first application flow and the application service instance for the first application flow.

16. The apparatus of claim 15, wherein each entry in the slice priority map is a key value pair including a slice identification (ID) and a priority value that represents a relative priority of a specified slice among the multiple alternate slices.

17. The apparatus of claim 13, wherein, to select the alternate network slice, the processor is configured to identify a fallback slice defined as part of a network slice selection policy as the alternate network slice.

18. The apparatus of claim 11, wherein the required QoS of the first application flow for the new network slice is a QoS within a predetermined offset from the required QoS of the first application flow.

19. The apparatus of claim 11, wherein the alternate network slice is not in a deny slice list.

20. The apparatus of claim 18, wherein the processor is further configured to identify the offset for the QoS from a parameter offset table indicating an offset for each parameter in a QoS specification.

* * * * *